US011334244B2

(12) United States Patent
Choi et al.

(10) Patent No.: US 11,334,244 B2
(45) Date of Patent: May 17, 2022

(54) ELECTRONIC DEVICE AND METHOD OF PROCESSING POP-UP WINDOW USING MULTI-WINDOW THEREOF

(71) Applicant: SAMSUNG ELECTRONICS CO., LTD., Suwon-si (KR)

(72) Inventors: Kyuok Choi, Suwon-si (KR); Younghak Oh, Suwon-si (KR); Bokeun Kim, Suwon-si (KR); Inkyeong Shin, Suwon-si (KR); Won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/066,813

(22) Filed: Oct. 9, 2020

(65) Prior Publication Data

US 2021/0109653 A1 Apr. 15, 2021

(30) Foreign Application Priority Data

Oct. 14, 2019 (KR) .................. 10-2019-0127087

(51) Int. Cl.
*G06F 3/041* (2006.01)
*G06F 3/04886* (2022.01)
(Continued)

(52) U.S. Cl.
CPC ........ *G06F 3/04886* (2013.01); *G06F 1/1616* (2013.01); *G06F 1/1647* (2013.01); *G06F 1/1652* (2013.01); *H04M 1/72469* (2021.01)

(58) Field of Classification Search
CPC .... G06F 1/1616; G06F 1/1641; G06F 1/1647; G06F 1/1652; G06F 3/0481;
(Continued)

(56) References Cited

U.S. PATENT DOCUMENTS 7,437,358 B2 * 10/2008 Arrouye .................. G06F 16/38
8,850,354 B1 * 9/2014 Titov ...................... G06F 9/451
715/804

(Continued)

FOREIGN PATENT DOCUMENTS

KR 10-2014-0136794 12/2014
KR 10-2016-0073205 6/2016

(Continued)

OTHER PUBLICATIONS

International Search Report and Written Opinion dated Jan. 29, 2021 in corresponding International Application No. PCT/KR2020/013683.

*Primary Examiner* — Joe H Cheng
(74) *Attorney, Agent, or Firm* — Nixon & Vanderhye P.C.

(57) ABSTRACT

Various embodiments of the present disclosure relate to an electronic device and a method of processing a pop-up window using a multi-window thereof. The electronic device includes: a housing; a display viewable through a first face of the housing; a processor operatively coupled with the display; and a memory operatively coupled with the processor. The memory may store instructions which, when executed, cause the processor to control the electronic device to: in response to occurrence of an event, display a pop-up window including a first User Interface (UI) corresponding to the event in some regions of the display, detect an input requesting extending and displaying the pop-up window, identify whether a multi-window is active in response to the detection of the input, and based on the multi-window being active, remove the pop-up window and display a second UI for the event on a sub-window having a lowest priority among at least one sub-window other than a main window among the multi-windows.

17 Claims, 21 Drawing Sheets

(51) Int. Cl.
*G06F 1/16* (2006.01)
*H04M 1/72469* (2021.01)

(58) Field of Classification Search
CPC .. G06F 3/0482; G06F 3/0488; G06F 3/04886; G06F 3/1431; G06F 2203/04803; H04M 1/72403; H04M 1/72469
See application file for complete search history.

(56) References Cited

U.S. PATENT DOCUMENTS

| | | | |
|---|---|---|---|
| 9,513,929 | B2 | 12/2016 | Pfeifer |
| 9,648,062 | B2 | 5/2017 | Chaudhri et al. |
| 9,684,342 | B2 | 6/2017 | Kim et al. |
| 2007/0050778 | A1 | 3/2007 | Lee et al. |
| 2008/0163104 | A1 | 7/2008 | Haug |
| 2011/0131527 | A1 | 6/2011 | Kim et al. |
| 2011/0193806 | A1* | 8/2011 | Kim ................. G06F 1/1641 345/173 |
| 2013/0076683 | A1* | 3/2013 | Reeves ................. G06F 9/44 345/173 |
| 2014/0118317 | A1 | 5/2014 | Song et al. |
| 2014/0218372 | A1* | 8/2014 | Missig ................. G06F 3/167 345/473 |
| 2015/0113455 | A1* | 4/2015 | Kang ................. G06F 3/04883 715/765 |
| 2015/0338888 | A1 | 11/2015 | Kim et al. |
| 2016/0048270 | A1* | 2/2016 | An ................. G06F 3/04886 715/773 |
| 2016/0094504 | A1* | 3/2016 | Cinar ................. H04L 65/403 715/752 |
| 2017/0010847 | A1* | 1/2017 | Bernstein ............. G06F 3/0238 |
| 2017/0185212 | A1* | 6/2017 | Jeong ................. G06F 3/0416 |
| 2019/0037173 | A1* | 1/2019 | Lee ................. H04W 76/15 |
| 2019/0065240 | A1* | 2/2019 | Kong ................. G06F 9/451 |
| 2019/0179487 | A1* | 6/2019 | Kong ................. G06F 3/04886 |
| 2020/0076940 | A1 | 3/2020 | Kim et al. |
| 2021/0109703 | A1* | 4/2021 | Kim ................. H04M 1/725 |

FOREIGN PATENT DOCUMENTS

| | | | |
|---|---|---|---|
| KR | 10-2017-0090295 | | 8/2017 |
| WO | WO-2018182270 A1 * | 10/2018 | ............ H04M 1/725 |

* cited by examiner

[1130]

[1135]

[1150]

[1153]

[1155]

[1170]

[1172]

[1174]

[1176]

[1230]

[1235]

[1250]

[1255]

ELECTRONIC DEVICE AND METHOD OF PROCESSING POP-UP WINDOW USING MULTI-WINDOW THEREOF

CROSS-REFERENCE TO RELATED APPLICATION

This application is based on and claims priority under 35 U.S.C. § 119 to Korean Patent Application No. 10-2019-0127087, filed on Oct. 14, 2019, in the Korean Intellectual Property Office, the disclosure of which is incorporated by reference herein in its entirety.

BACKGROUND

Field

The disclosure relates to an electronic device and a method of processing a pop-up window using a multi-window thereof.

Description of Related Art

Electronic devices (e.g., a mobile terminal, a smartphone, or a wearable terminal) may provide various functions (e.g., a music playback function, a navigation function, a short-range wireless communication (e.g., Bluetooth, Wi-Fi, Near Field Communication (NFC)) function, a fingerprint recognition function, a photo (still image) capturing or video capturing (recording) function, an electronic payment function, etc.).

With improvement of performance and increase in a display size, the electronic device may provide a multi-window function capable of dividing a display (or a screen) into a plurality of regions and executing a different application in each region.

When an event is received, an electronic device may display the event in some regions of a display through a pop-up window. However, due to a size limitation, the pop-up window cannot display every information, and can display only part of information (e.g., in case of call reception, caller information, reject menu, grant menu, and extension menu). When a touch input is made or an extension menu is selected, the pop-up window may be displayed as an entire screen (a full screen) of the display. The pop-up window which has extended to the full screen may further display additional information (e.g., in case of call reception, a keypad menu, a microphone-off menu, a Bluetooth menu).

However, when the pop-up window is displayed as the full screen, there may be inconvenience in that a user of the electronic device cannot use an application previously used.

SUMMARY

Embodiments of the disclosure provide an apparatus and method in which when there is a request for displaying a pop-up window corresponding to an event in an extended manner, an execution screen of the existing application and an application corresponding to the pop-up window (the event) can be displayed using a multi-window (screen division).

Embodiments of the disclosure provide a method and apparatus for displaying of the pop-up window according to folding and/or unfolding of the electronic device can be effectively controlled.

An electronic device according to various example embodiments includes: a housing; a display viewable through a first face of the housing; a processor operatively coupled with the display; and a memory operatively coupled with the processor. The memory may store instructions which, when executed, cause the processor to control the electronic device to: in response to occurrence of an event, display a pop-up window including a first User Interface (UI) corresponding to the event in some regions of the display, detect an input requesting extending and displaying the pop-up window, identify whether a multi-window is active in response to detecting the input, and based on identifying that the multi-window is active, remove the pop-up window and display a second UI for the event on a sub-window having a lowest priority among at least one sub-window other than for a main window among the multi-windows.

An electronic device according to various example embodiments of the present disclosure includes: a housing; a display viewable through a first face of the housing; a processor operatively coupled with the display; and a memory operatively coupled with the processor. The memory may store instructions which, when executed, cause the processor to control the electronic device to: in response to occurrence of an event, display a pop-up window including a first UI corresponding to the event in some regions of the display, detect an input requesting extending and displaying the pop-up window, identify whether a multi-window is active in response to the detecting the input, based on the identifying that the multi-window is active, identify whether a number of active multi-windows is less than a designated number, and based on identifying that the number of active multi-windows is less than the designated number, remove the pop-up window, add a sub-window through additional division of the display, and display a second UI for the event on the added sub-window.

A method of processing a pop-up window using a multi-window of an electronic device according to various embodiments includes: in response to occurrence of an event, displaying a pop-up window including a first UI corresponding to the event in some regions of the display; in response to an input requesting extending the pop-up window, identifying whether the multi-window is active; based on the multi-window being active, identifying whether the number of active multi-windows is less than a designated number; and based on the number of active multi-windows being less than the designated number, removing the pop-up window, add a sub-window through additional division of the display, and displaying a second UI for the event on the added sub-window.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
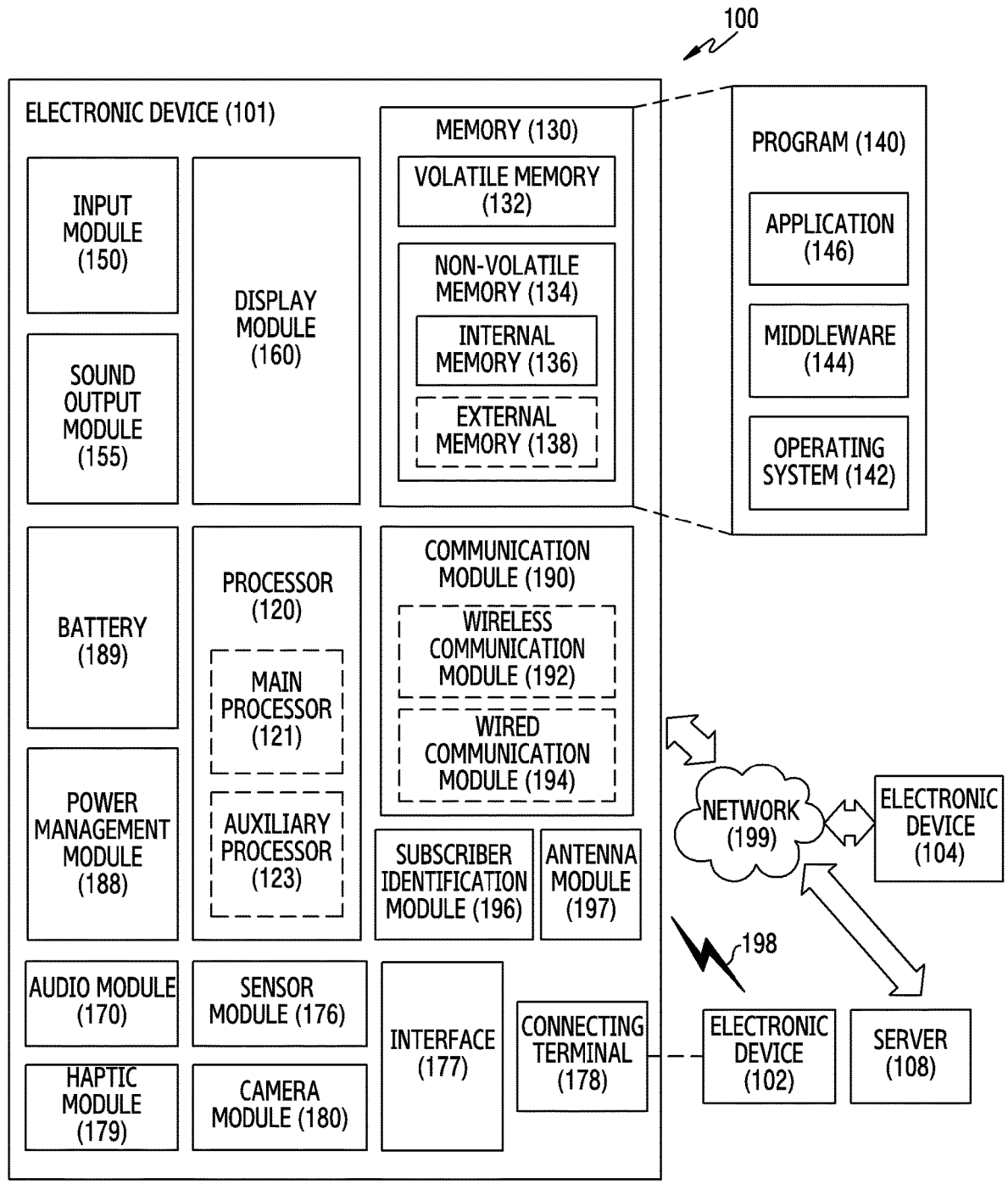
FIG. 1 is a block diagram illustrating an example electronic device in a network environment according to various embodiments.

Hereinafter, various example embodiments will be described in greater detail with reference to the accompanying drawings. Although various example embodiments are illustrated in the drawings and described in detail with reference thereto, the example embodiments are not intended to limit the embodiments to specific forms. For example, it would be apparent to a person skilled in the art to which the disclosure pertains that the embodiments can be modified. Detailed descriptions of known functions and/or configurations may be omitted for the sake of clarity and conciseness.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, if the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specialized for processing an artificial intelligence model. The artificial intelligence model may be created through machine learning. Such learning may be performed, for example, in the electronic device 101 on which artificial intelligence is performed, or may be performed through a separate server (e.g., the server 108). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155, or an external electronic device (e.g., an electronic device 102)(e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 192 may support, for example, a high frequency band (e.g., an mmWave band) to achieve a high data rate. The wireless communication module 192 may support various technologies for securing performance in a high frequency band, for example, beamforming, massive array Multiple-Input and Multiple-Output (MIMO), and Full-Dimensional MIMO (FD-MIMO), an array antenna, analog beam-forming, or a large scale antenna. The wireless communication module 192 may support various requirements defined in the electronic device 101, an external electronic device (e.g., the electronic device 104), or a network system (e.g., the second network 199). According to an embodiment, the wireless communication module 192 may support a peak data rate (e.g., 20 Gbps or more) for realizing eMBB, a loss coverage (e.g., 164 dB or less) for realizing mMTC, or U-plane latency (e.g., 0.5 ms or less or a round trip of 1 ms or less for each of downlink (DL) and uplink (UL)) for realizing URLCC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas (e.g., array antenna). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may construct an mmWave antenna module. According to an embodiment, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, technologies of cloud computing, distributed computing, Mobile Edge Computing (MEC), or client-server computing may be used. The electronic device 101 may provide an ultra-low latency service using, for example, distributed computing or mobile edge computing. In another embodiment, the external electronic device 104 may include an Internet of Things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., a smart home, a smart city, a smart car, or health care) based on a 5G communication technique and an IoT related technique.

Prior to the detailed description, an electronic device (e.g., the electronic device 101) according to an embodiment of the present disclosure may include: a first face through which a display (e.g., the display module 160) is viewable and a second face disposed opposite the first face. The electronic device may support a multi-window function capable of dividing (splitting) the display (or screen) into a plurality of regions and displaying an execution screen of another application in each region. According to various embodiments, the electronic device may be a foldable-type electronic device. The foldable-type electronic device may include a bendable flexible display viewable through the first face and an external display viewable through part of the second face.

Figure 2:
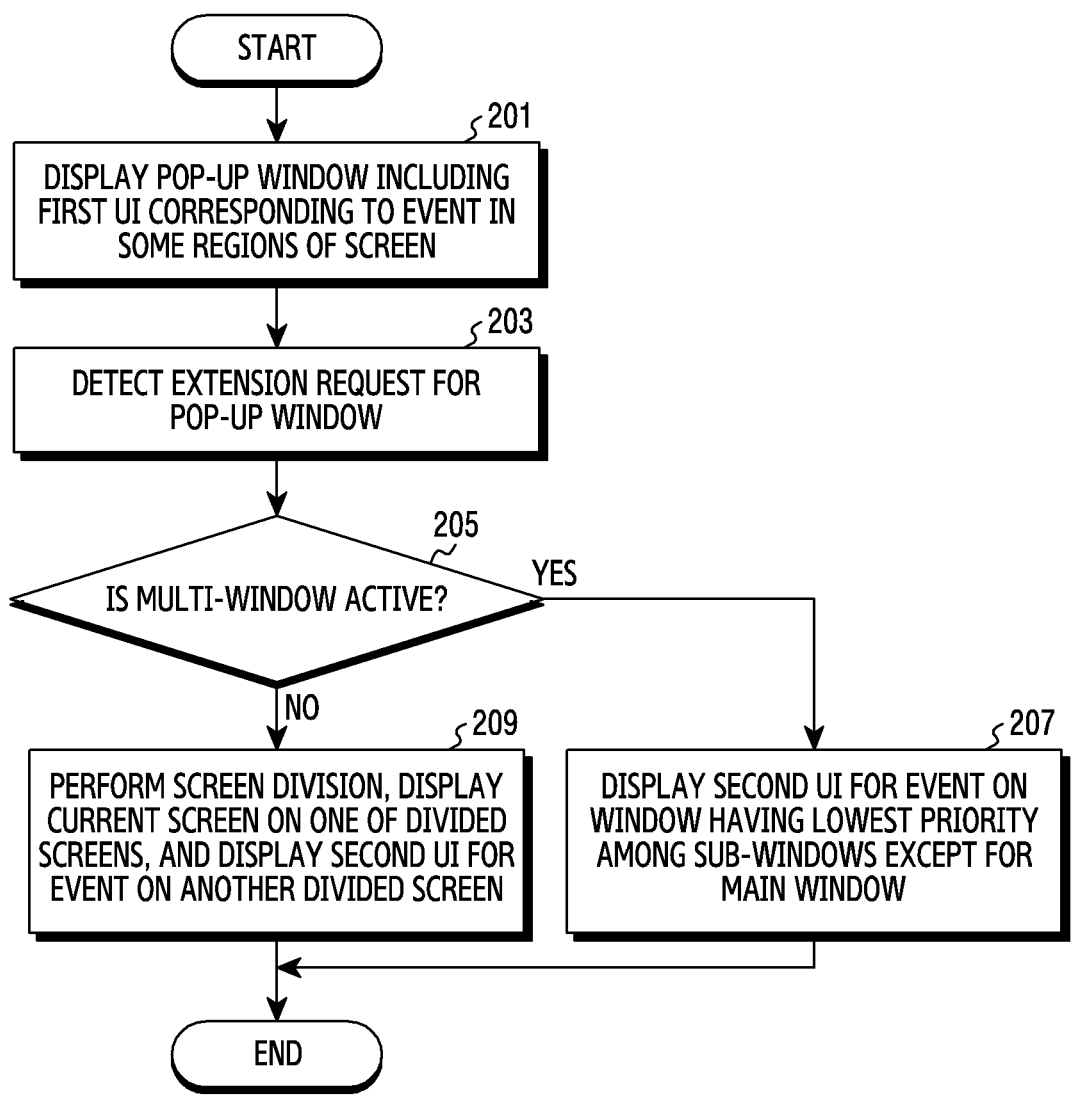
FIG. 2 is a flowchart illustrating an example method of processing a pop-up window of an electronic device according to various embodiments.
Figure 3A:
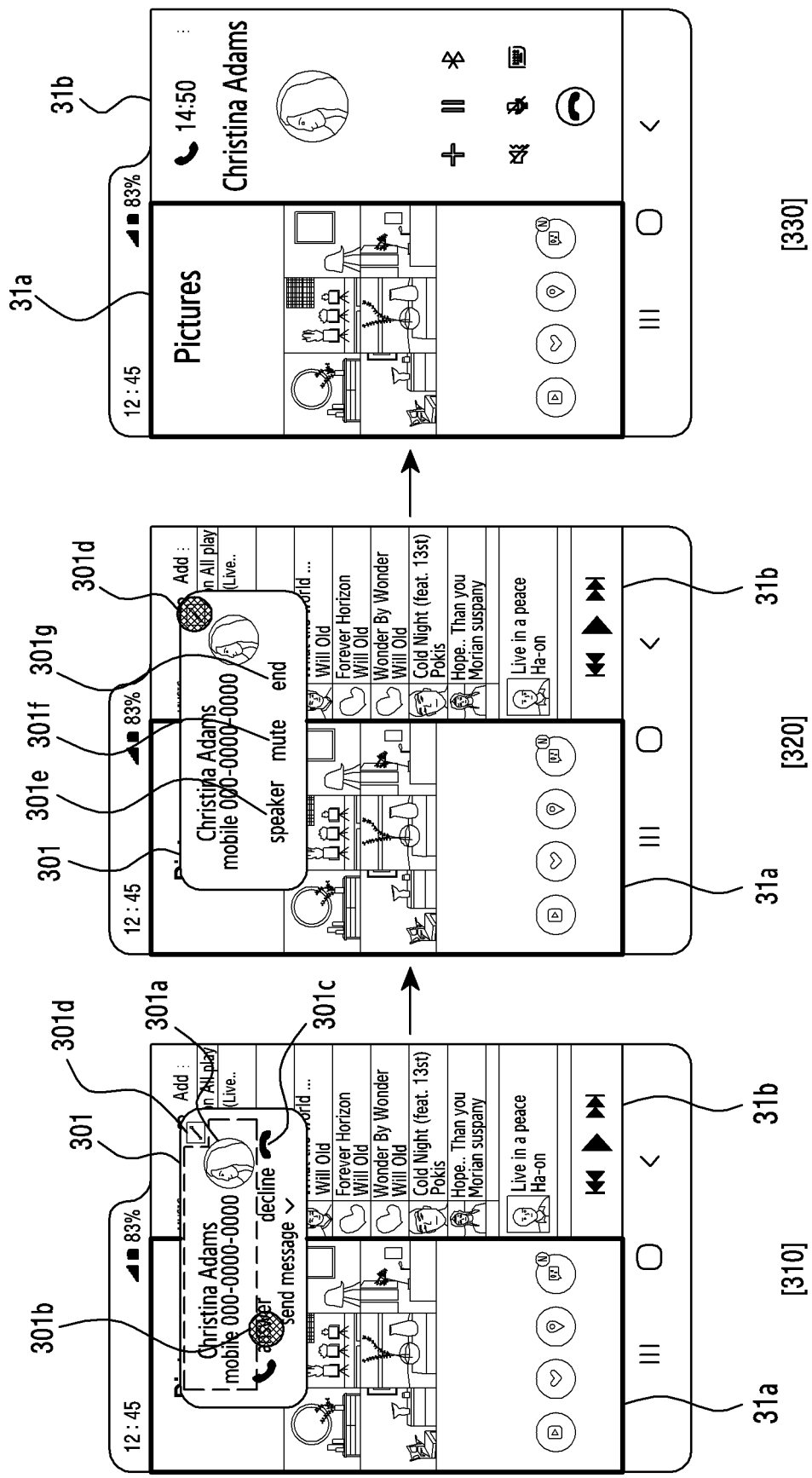
FIG. 3A is a diagram illustrating an example of processing a pop-up window with respect to an electronic device according to various embodiments.
Figure 3B:
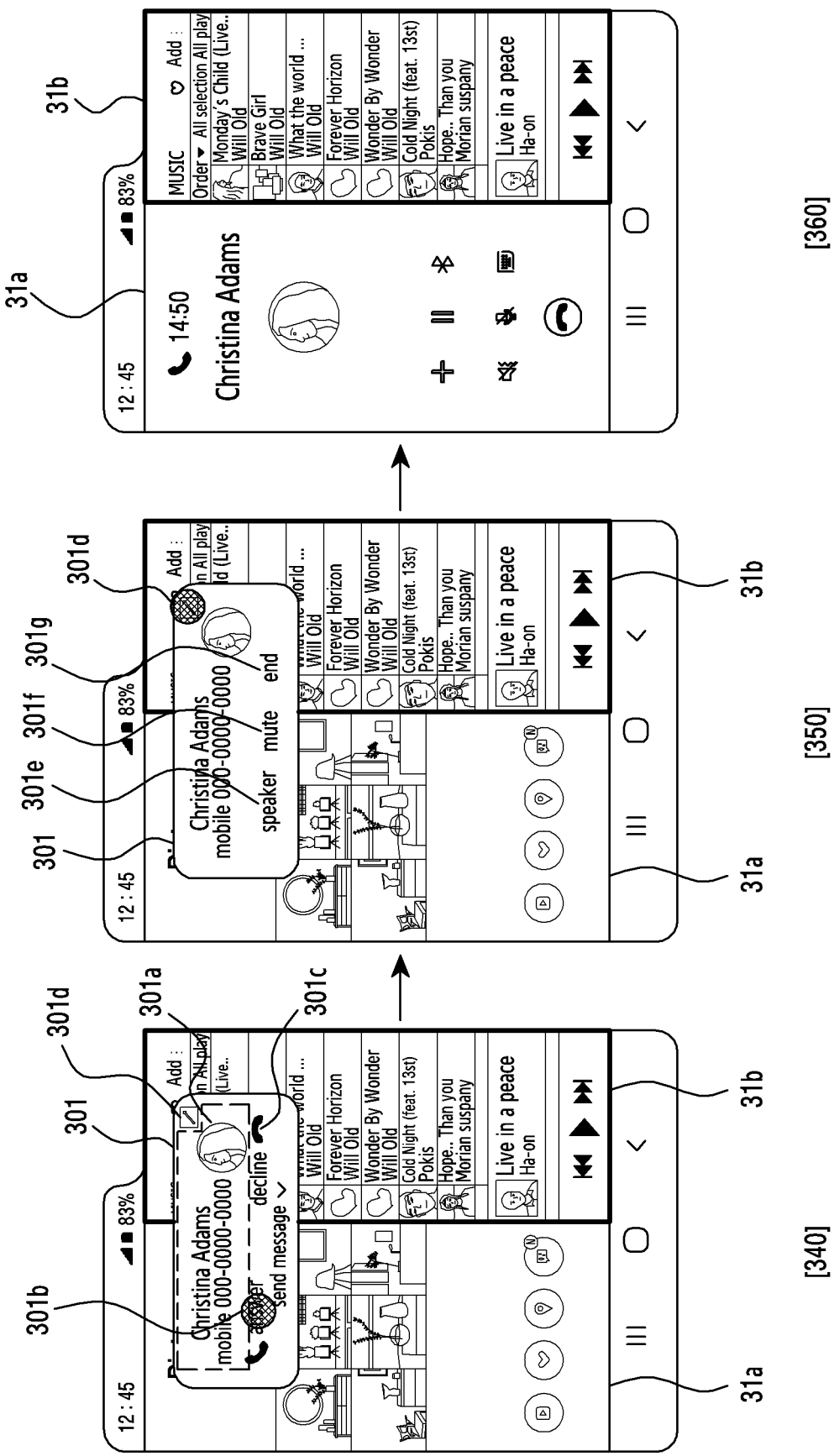
FIG. 3B is a diagram illustrating an example of processing a pop-up window with respect to an electronic device according to various embodiments.
Figure 4A:
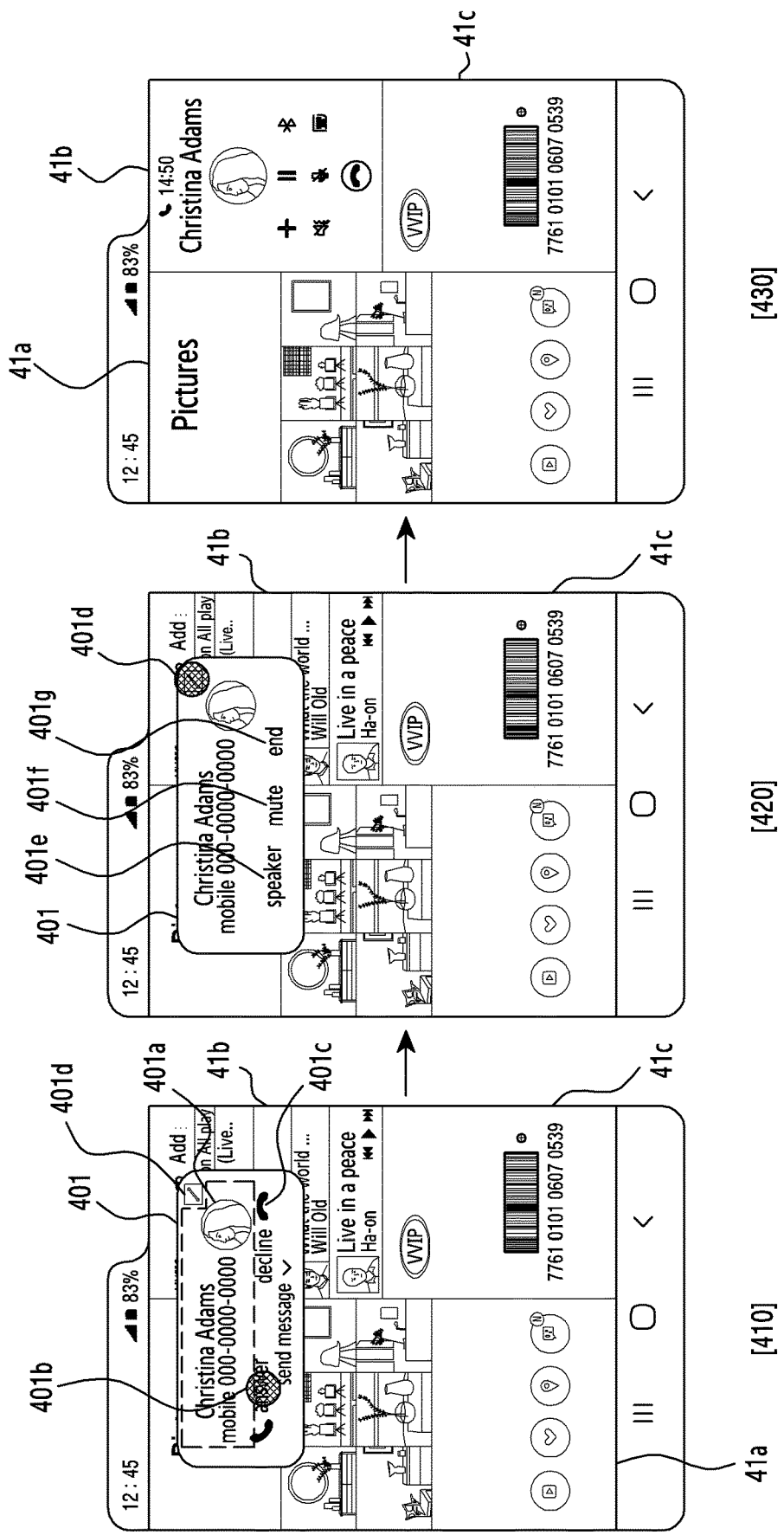
FIG. 4A is a diagram illustrating an example of processing a pop-up window with respect to an electronic device according to various embodiments.
Figure 4B:
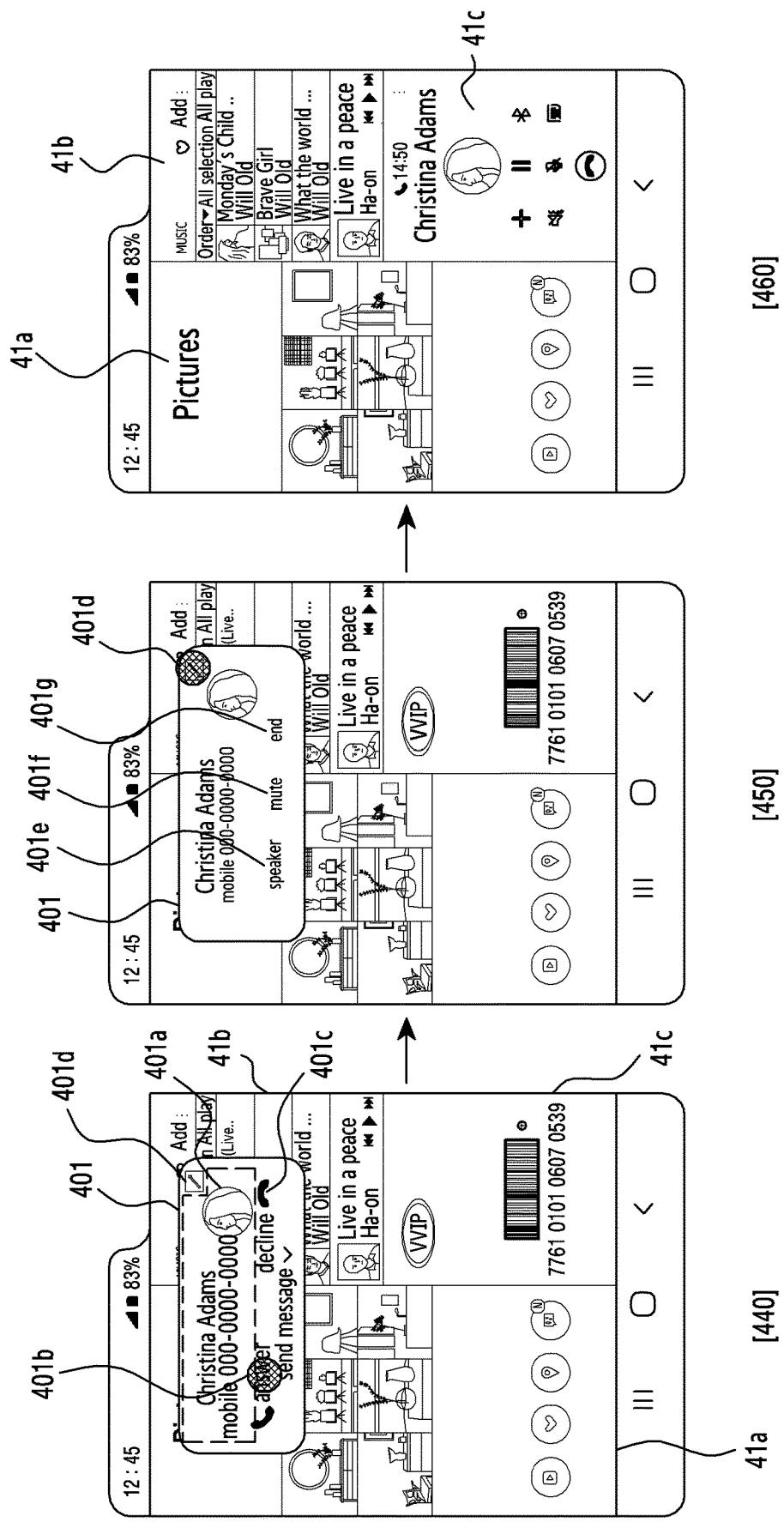
FIG. 4B is a diagram illustrating an example of processing a pop-up window with respect to an electronic device according to various embodiments.

FIG. 2 is a flowchart illustrating an example method of processing a pop-up window of an electronic device according to various embodiments. FIG. 3A and FIG. 3B are diagrams illustrating an example of processing a pop-up window with respect to an electronic device according to various embodiments. FIG. 4A and FIG. 4B are diagrams illustrating an example of processing a pop-up window with respect to an electronic device according to various embodiments.

Referring to FIG. 2, 3A, 3B, 4A and FIG. 4B, in operation 201, a processor (e.g., the processor 120) of an electronic device (e.g., the electronic device 101) according to an embodiment of the present disclosure may provide control such that a pop-up window including a first User Interface (UI) corresponding to a received event is displayed in some regions of a screen (or a display). For example, the processor may provide control such that a pop-up window for reporting reception of an event is displayed (e.g., in an overlapping manner) in some regions of the display in response to receiving of the event via a communication circuit (e.g., the communication module 190) while at least one application is running. The first UI may include part of information related to the event. The event may include call reception, text message reception, or push message reception that can be displayed through a pop-up window. The present disclosure is not limited thereto.

Hereinafter, for convenience of explanation, a case where a call request is received will be described as an example. For example, as shown in the figure by a reference numeral 310 of FIG. 3A and a reference numeral 340 of FIG. 3B, the processor may control the display such that a pop-up window 301 for reporting call reception is displayed in some regions at an upper end of a screen when receiving a call. For another example, as shown in the figure by a reference numeral 410 of FIG. 4A and a reference numeral 440 of FIG. 4B, the processor may control the display such that a pop-up window 401 for reporting call reception is displayed in some regions at an upper end of a screen when receiving a call. The pop-up windows 301 and 401 may include caller information 301a and 401a, grant (accept) menus 301b and 401b, reject (decline) menus 301c and 401c, and extension menus 301d and 401d.

The processor according to various embodiments may activate a call when the grant menus 301b and 401b are selected, in a state as shown in the figure by the reference numerals 310, 340, 410, and 440. When the call is active, as shown in the figure by reference numerals 320, 350, 420, and 450, the processor may change the grant menus 301b and 401b and reject menus 301c and 401c of the pop-up windows 301 and 401 to speaker phone menus 301e and 401e, mute menus 301f and 401f, and end menus 301g and 401g.

In operation 203, the processor according to various embodiments may detect an extension request for the pop-up window. For example, as shown in the figure by the reference numerals 320, 350, 420, and 450, the processor may determine that the extension request occurs when the extension menus 301d and 401d are selected (e.g., touched). The extension request may be a request for switching the first UI for the event to a second UI. The second UI may further include another information (e.g., in case of call reception, a keypad menu, a microphone-off menu, a Bluetooth menu) for the event. According to some embodiments, the processor may detect selection (e.g., touch) of the extension menus 301d and 401d in a state as shown in the figure by the reference numerals 310, 340, 410, and 440.

According to some embodiments, when the extension menus 301d and 401d are not included in the pop-up windows 301 and 401 and a designated touch input (e.g., a tab, a double-touch, a long-touch, a gesture, a pressure touch, etc.) is detected in a region of the pop-up windows 301 and 401, the processor may determine that an extension request of the pop-up windows 301 and 401 occurs.

In operation 205, the processor according to various embodiments may identify whether it is a state where the multi-window is active. For example, the processor may identify whether the multi-window is running (e.g., an extension screen of each of a plurality of applications is displayed on the multi-window) in response to the extension request.

If the identification result of operation 205 shows that the multi-window is active ("Yes" in operation 205), in operation 207, the processor may display the second UI for the event on a sub-window having a lowest priority among sub-windows except for the main window. The second UI may be displayed not on a full screen of the display but on a full screen of the sub-window having the lowest priority. The second UI may be an extended UI including the same information as the first UI. According to some embodiments, the second UI may include additional information not included in the first UI. The main window may be a window having a greatest size when the multi-windows have different sizes. According to some embodiments, the main window may be a window currently selected (e.g., focused) among the multi-windows. The priority may be determined based on a usage history of the multi-windows. For example, the more recently the window is used, the higher the priority thereof may be.

According to an embodiment, as shown in the figure by the reference numeral 320, if it is requested to extend the pop-up window 301 in a multi-window state in which an execution screen of a first application is displayed in a first divided region 31a and an execution screen of a second application is displayed in a second divided region 31b, then as shown in the figure by a reference numeral 330, a call screen may be displayed in the entirety of the second divided region 31b, not the focused first divided region 31a. Similarly, as shown in the figure by reference numerals 350 and 360, if it is requested to extend the pop-up window 301, the processor may display the call screen in the entirety of the first divided region 31a, not the focused second divided region 31b.

For another example, as shown in the figure by the reference numeral 420 of FIG. 4A and the reference numeral 450 of FIG. 4B, if it is requested to extend the pop-up window 401 in a multi-window state in which an execution screen of a first application is displayed in a first divided region 41a and an execution screen of a second application is displayed in a second divided region 41b, then as shown in the figure by a reference numeral 430 of FIG. 4A and a reference numeral 460 of FIG. 4B, the processor may display a call screen in the entirety of the second divided region 41b or the entirety of the third divided region 41c, based on a priority of the second divided region 41b and third divided region 41c, except for the first divided region 41a (main window) having a greatest size.

If the identification result of operation 205 shows that the multi-window is not active ("No" in operation 205), in operation 209, the processor may perform screen division, may display a current screen (e.g., a home screen, or an execution screen of an application currently being displayed) on one of the divided screens, and may display the second UI for the event on another divided screen. For example, as shown in FIG. 6A described below, the processor may divide the screen into two regions, may display the current screen in the entirety of one of the divided regions, and may display the second UI in the entirety of the other region.

The electronic device according to the aforementioned various embodiments of the present disclosure may use a multi-window when it is requested to extend the pop-up window, so as to provide control such that an application corresponding to a pop-up window and an application previously running are displayed together. Therefore, usability of some of applications previously running may be maintained. For example, when a drawing application is running, the drawing application and a call application may be displayed together through the multi-window, so that a user of the electronic device can continuously perform the drawing application or can perform a required task (e.g., an input through a keypad) on a call screen, without having to switch a screen between the drawing application and the call application.

Figure 5:
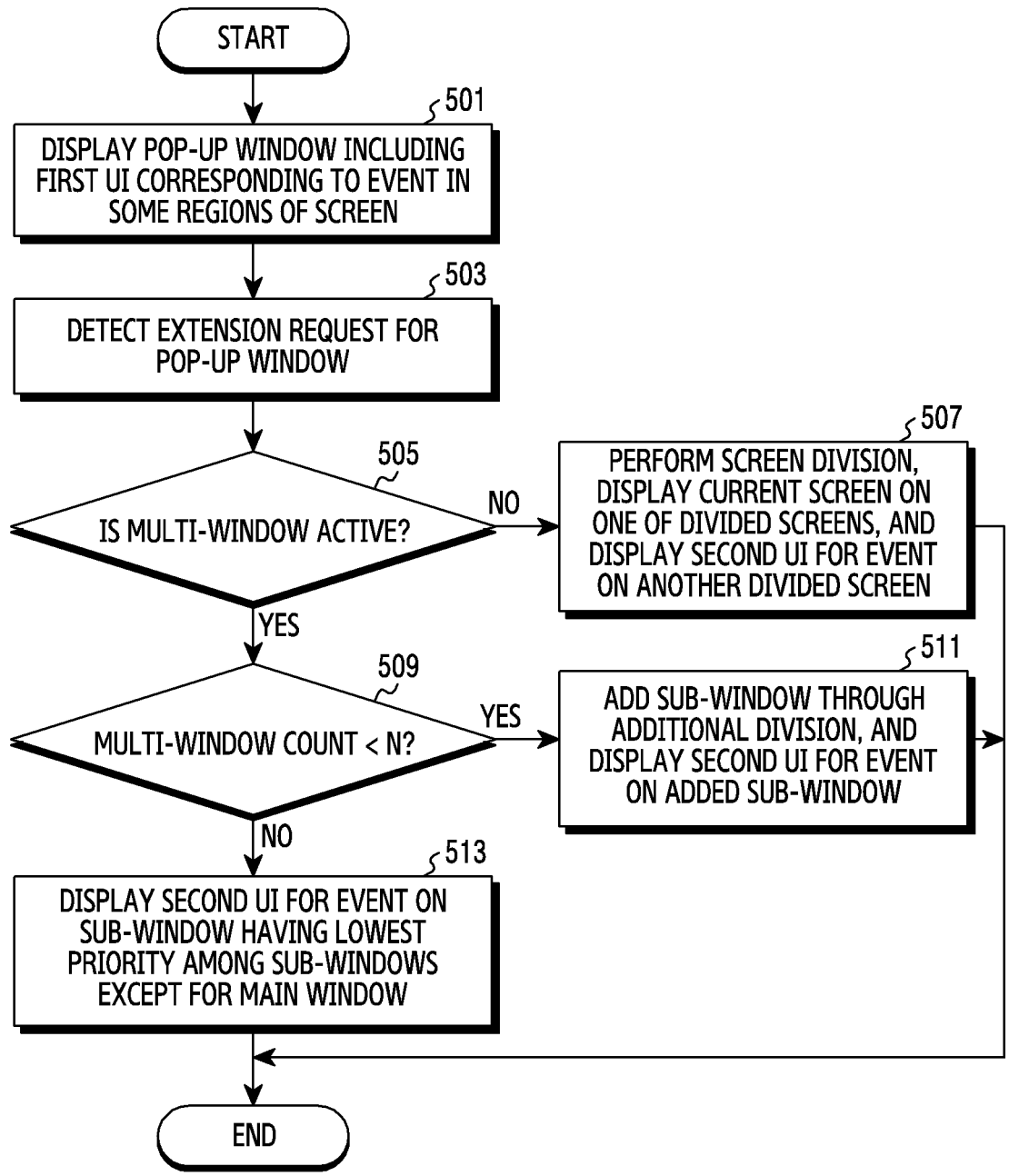
FIG. 5 is a flowchart illustrating an example method of processing a pop-up window of an electronic device according to various embodiments.
Figure 6A:
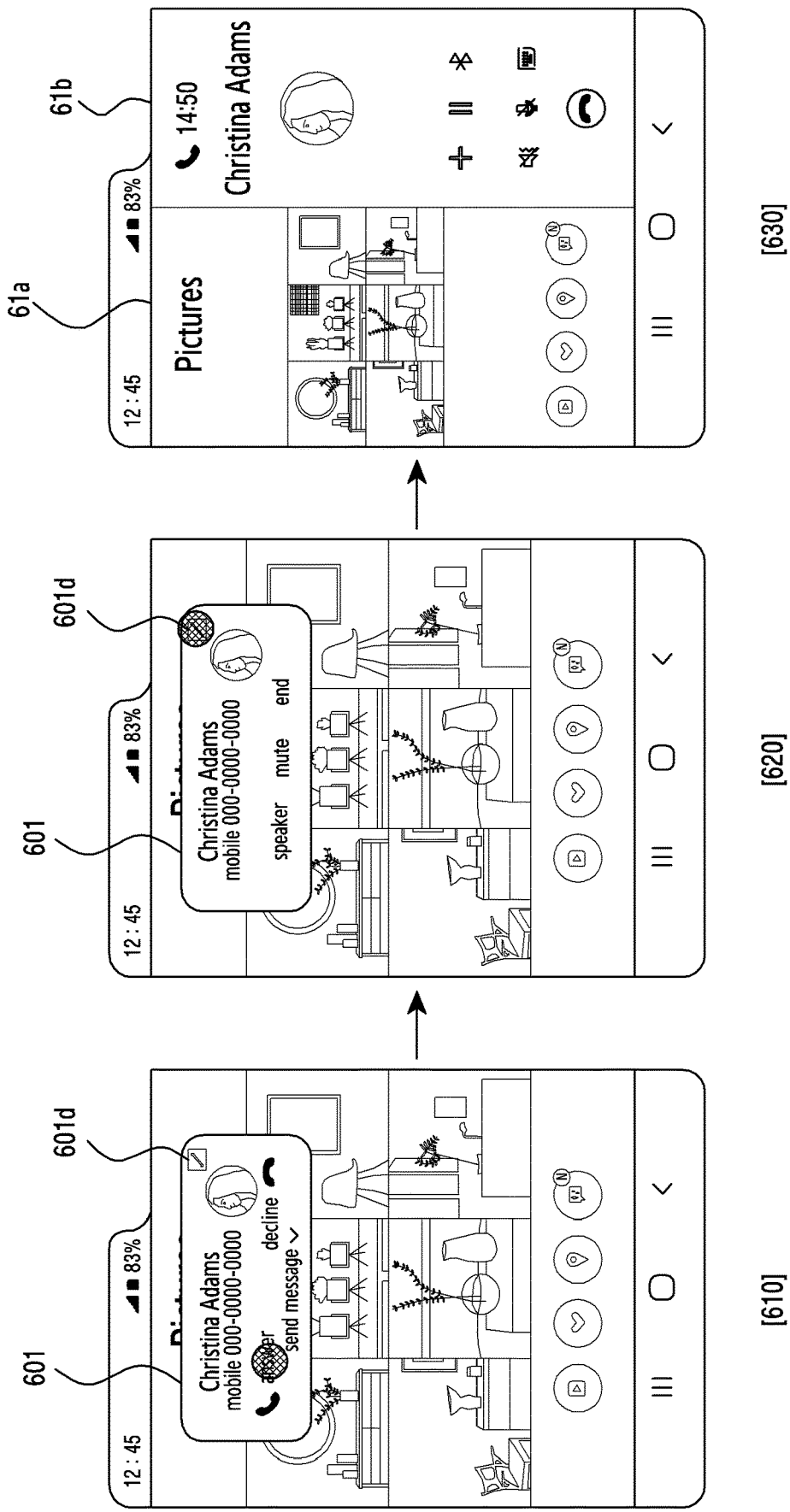
FIG. 6A is a diagram illustrating an example of processing a pop-up window of an electronic device according to various embodiments.
Figure 6B:
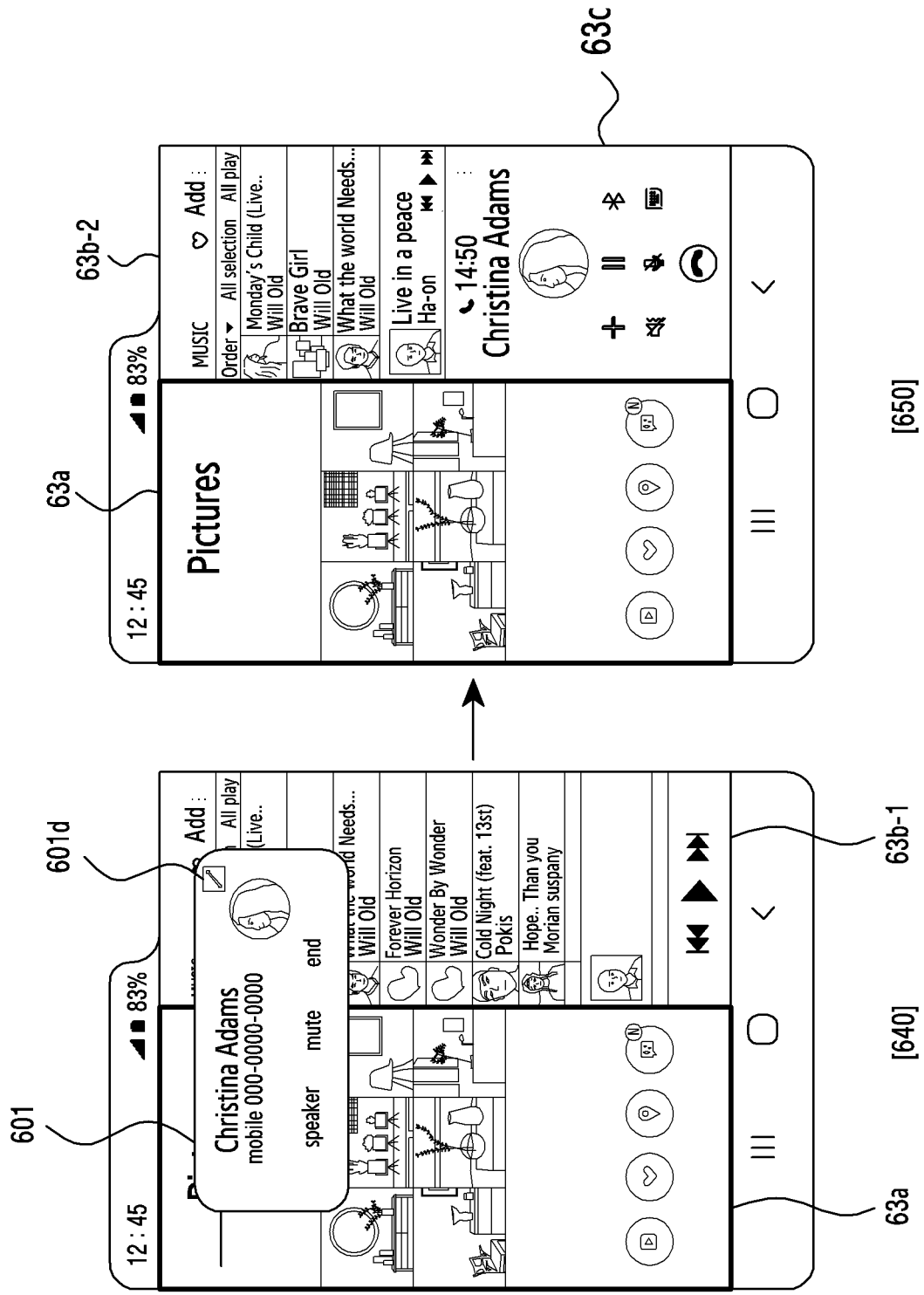
FIG. 6B is a diagram illustrating an example of processing a pop-up window of an electronic device according to various embodiments.
Figure 6C:
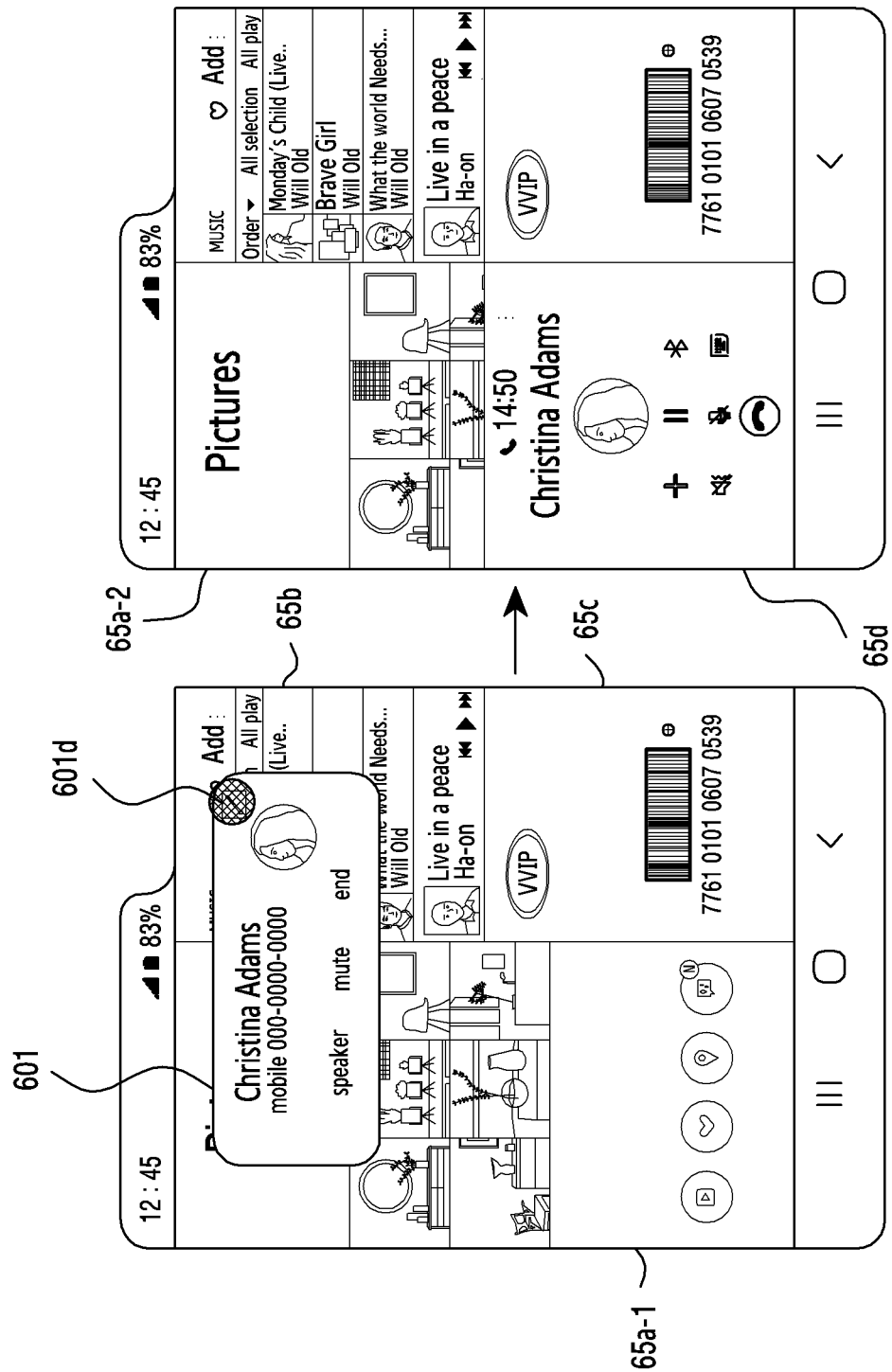
FIG. 6C is a diagram illustrating an example of processing a pop-up window of an electronic device according to various embodiments.

FIG. 5 is a flowchart illustrating an example method of processing a pop-up window of an electronic device according to various embodiments, and FIG. 6A, 6B and FIG. 6C are diagrams illustrating an example of processing a pop-up window of an electronic device according to various embodiments.

Referring to FIG. 5, 6A, 6B and FIG. 6C, in operation 501, an electronic device (e.g., the electronic device 101) according to an embodiment of the present disclosure may provide control such that a pop-up window including a first UI corresponding to a received event is displayed in some regions of a screen (or a display). For example, in response to receiving a call request event via a communication circuit (e.g., the communication module 190) while a first application is running, as shown in the figure by a reference numeral 610 of FIG. 6A, the processor may control the display such that a pop-up window for reporting call reception is displayed in some regions at an upper end of the screen. When a grant menu 601b is selected in a state as shown in the figure by the reference numeral 610, the processor may activate a call as shown in the figure by a reference numeral 620.

In operation 503, the processor according to various embodiments may detect an extension request for the pop-up window. For example, as shown in the figure by the reference numerals 620, 640, and 660, the processor may determine that the extension request occurs upon detecting selection (e.g., touch) of an extension menu 601d of the pop-up window 601. According to some embodiments, the processor may detect the selection (e.g., touch) of the extension menu 601d in a state as shown in the figure by the reference numeral 610. According to some embodiments, when the extension menu 601d is not included in the pop-up window 601 and when a designated touch input (e.g., a tap, a double-touch, a long-touch, a gesture, a pressure touch, etc.) is detected in a region of the pop-up window 601, the processor may determine that the extension request of the pop-up window 601 occurs.

In operation 505, the processor according to various embodiments may identify whether it is a state where a multi-window is active. For example, the processor may identify whether the multi-window is currently running in response to the extension request.

When the identification result of operation 505 shows that the multi-window is not active (e.g., when only one application is executed or a home screen is displayed) ("No" in operation 505), in operation 507, the processor may divide a screen, display a current screen on one of the divided screens, and display a second UI for the event on another divided screen. The second UI may be an extended UI including the same information as the first UI. According to some embodiments, the second UI may include additional information not included in the first UI. For example, as shown in FIG. 6A by a reference numeral 630, the processor may divide the screen into two, display an execution screen (or a home screen) of a first application in the entirety of a first divided region (or first window) 61a, and display an execution screen (e.g., a call screen) of a second application corresponding to a pop-up window 601 (or event) in the entirety of a second divided region (or second window) 61b. Although it is illustrated herein that the screen is divided in a vertical direction in the figure by the reference numeral 630, the screen may be divided into a horizontal direction according to a setting of the electronic device or a user's intention.

If the identification result of operation 505 shows that the multi-window is active ("Yes" in operation 505), in operation 509, the processor may identify whether the number of multi-windows is less than a designated number N. Herein, N may be a natural number (a positive integer), and may be the maximum number of divided screens supported by the electronic device. For example, N may be 4. This is for exemplary purposes only, and the embodiment of the present disclosure is not limited thereto.

If the identification result of operation 509 shows that the number of multi-windows is less than the designated number ("Yes" in operation 509), in operation 511, the processor may control the display such that a sub-window is added through additional division and a second UI for the event is displayed on the added sub-window. For example, as shown in the figure by the reference numeral 640 of FIG. 6B, upon detecting the extension request in a state where a screen is divided into a first divided region (first window) 63a of a first size and a second divided region (second window) 63b-1 of the first size, as shown in the figure by a reference numeral 650, the processor may generate a second divided region 63b-2 of a second size and a third divided region (third window) 63c of a third size by dividing the second divided region 63b-1 of the first size and may control the display such that a call screen is displayed in the entirety of the third divided region 63c. Herein, the second size and the third size may be identical or different. Meanwhile, since the first divided region 63a is focused as shown in the figure by the reference numeral 650, the processor generates the divided region 63b-2 of the second size and the third divided region 63c of the third size by dividing the second divided region 63b-1 of the first size. On the contrary, when the second divided region 63b-1 of the first size is focused, the processor may generate the first divided region of the second size and the third divided region 63c of the third size by dividing the first divided region 63a of the first size.

According to another embodiment, as shown in the figure by the reference numeral 660 of FIG. 6C, upon detecting the extension request in a state where the screen is divided into a first divided region (first window) 65a-1 of a fist size, a second divided region (second window) 65b of a second size, and a third divided region (third window) 65c of the second size, as shown in the figure by a reference numeral 670, the processor may generate a first divided region 65a-2 of the second size and a fourth divided region (fourth window) 65d of the second size by dividing the first divided region 65a-1 of the first size, and may control the display such that a call screen is displayed in the entirety of the fourth divided region 65d.

Meanwhile, although it is illustrated in the figure by the reference numerals 650 and 670 that the second divided region 63b-1 of the first size and the first divided region 65a-1 of the first size are divided in a horizontal direction, the processor may also divide the second divided region 63b-1 of the first size and the first divided region 65a-1 of the first size in a vertical direction according to a setting of the electronic device or a user's intention.

If the identification result of operation 509 shows that the number of multi-windows is not less than the designated number (e.g., if the number of multi-windows is equal to the designated number) ("No" in operation 509), in operation 513, the processor may control the display such that the second UI for the event is displayed on a sub-window having a lowest priority among sub-windows except for a main window. For example, as described above with reference to FIG. 3A, 3B, 4A and FIG. 4B, the processor may display an execution screen (e.g., a call screen) of an application corresponding to a pop-up window in the entirety of the sub-window having the lowest priority among the sub-windows except for the main window.

Figure 7:
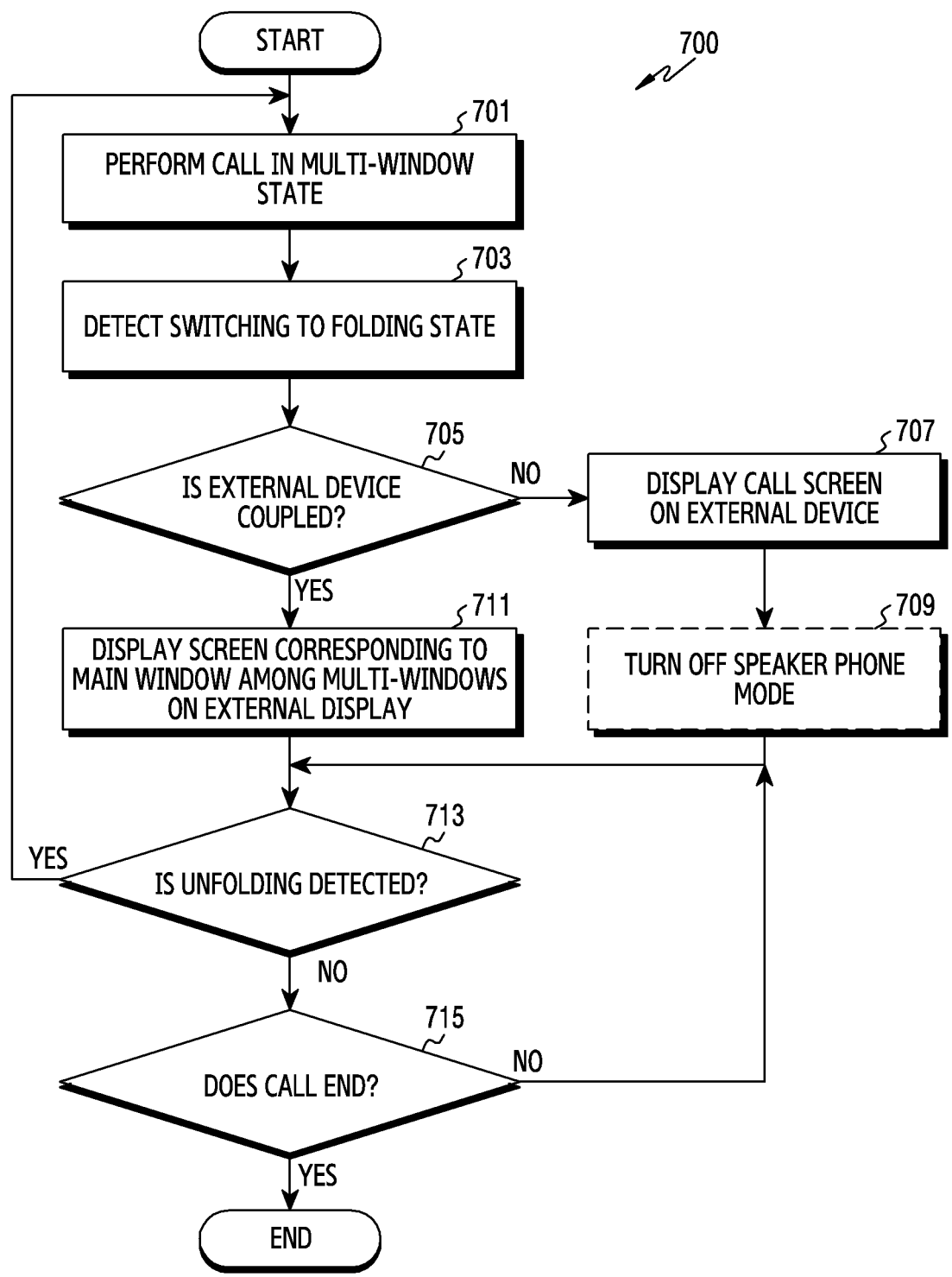
FIG. 7 is a flowchart illustrating an example method of processing a pop-up window of an electronic device when changed from an unfolding state to a folding state according to various embodiments.
Figure 8A:
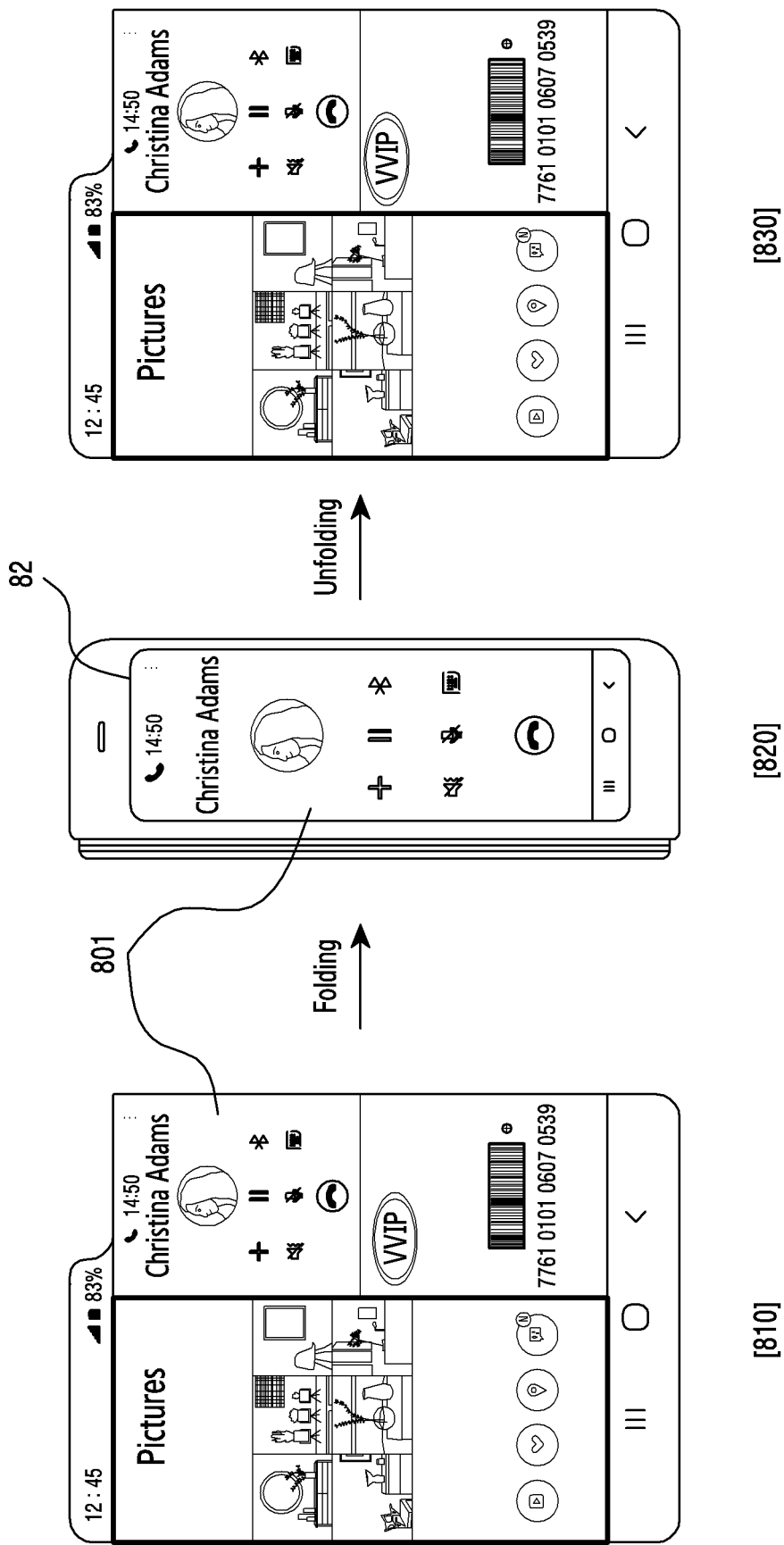
FIG. 8A is a diagram illustrating an example of processing a pop-up window of an electronic device when changed from an unfolding state to a folding state according to various embodiments.
Figure 8B:
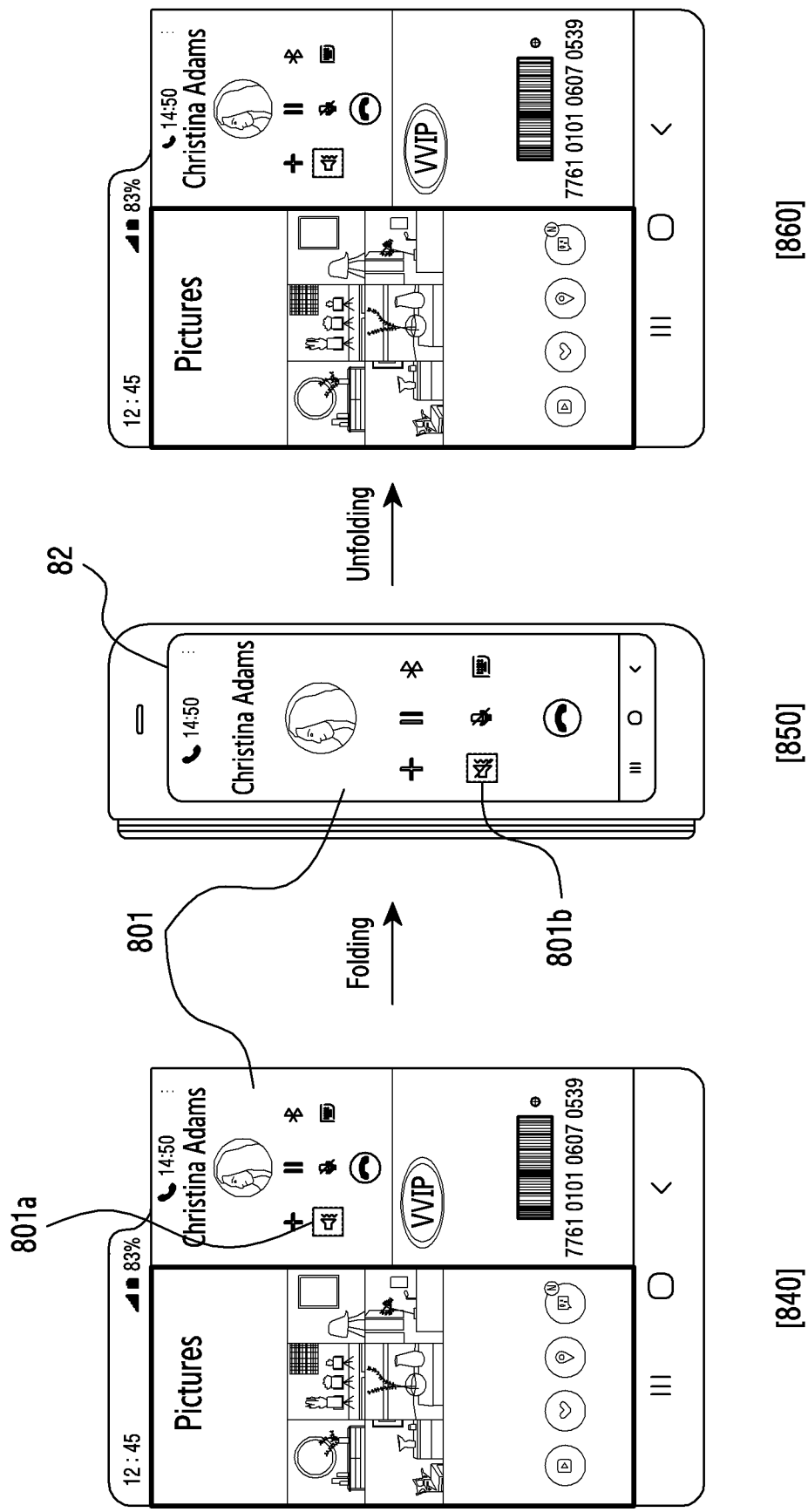
FIG. 8B is a diagram illustrating an example of processing a pop-up window of an electronic device when changed from an unfolding state to a folding state according to various embodiments.
Figure 8C:
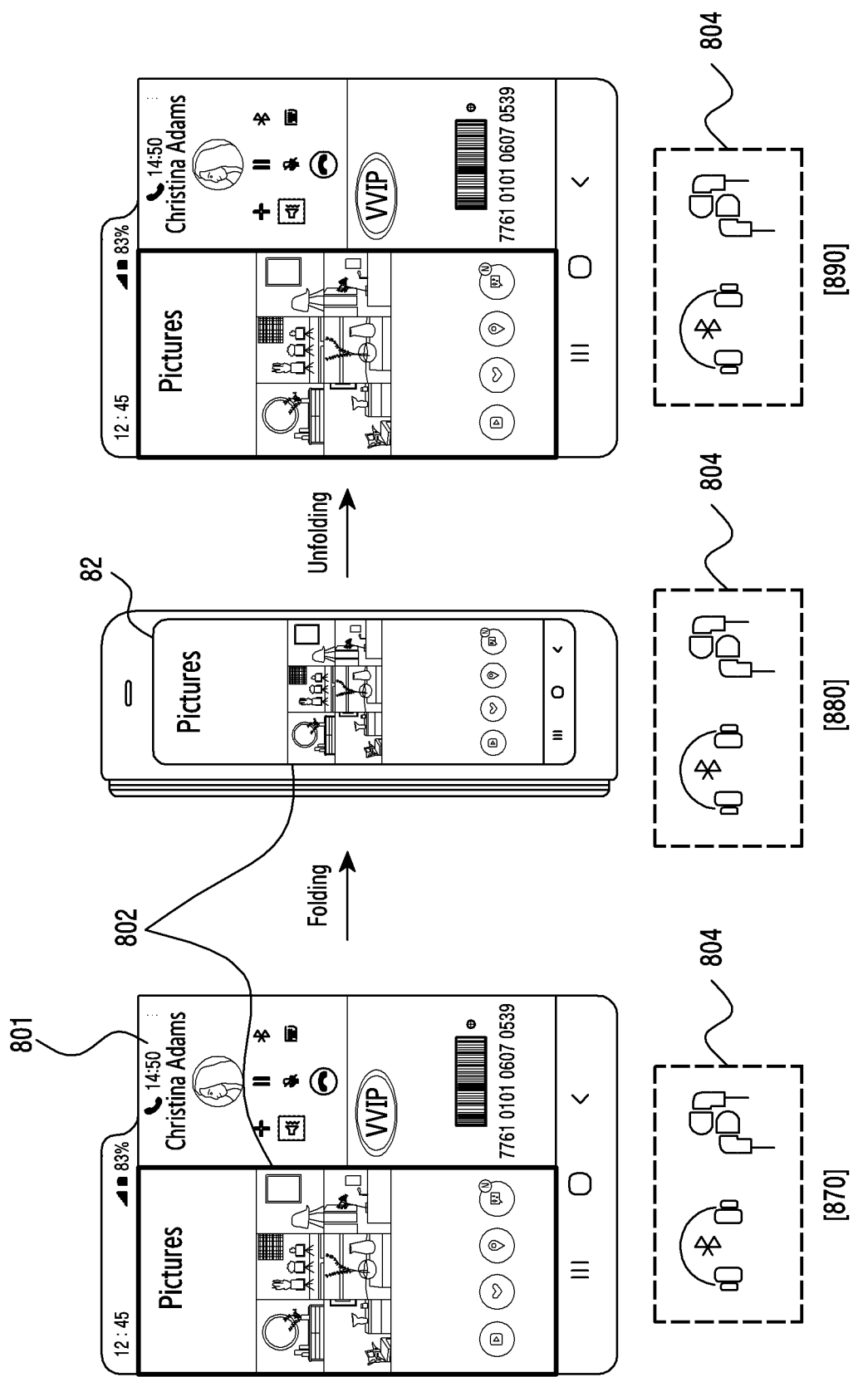
FIG. 8C is a diagram illustrating an example of processing a pop-up window of an electronic device when changed from an unfolding state to a folding state according to various embodiments.

FIG. 7 is a flowchart illustrating an example method of processing a pop-up window of an electronic device when changed from an unfolding state to a folding state according to various embodiments, and FIG. 8A, 8B and FIG. 8C are diagrams illustrating an example of processing a pop-up window of an electronic device when changed from an unfolding state to a folding state according to various embodiments.

Prior to the detailed description, an electronic device according to an embodiment of the present disclosure may, for example, include a foldable-type electronic device, and may include a flexible display viewable through a first face of a housing and an external display exposed through a second face.

Referring to FIG. 7, 8A, 8B and FIG. 8C, in operation 701, an electronic device (e.g., the electronic device 101) according to an embodiment of the present disclosure may perform a call in a state where a multi-window is active. For example, as shown in the figures by reference numerals 810, 840, and 870, a processor of the electronic device may display a call screen (e.g., an execution screen of an application corresponding to a pop-up window) 801 on one of multi-windows in an unfolding state, and then may perform the call.

In operation 703, the processor according to various embodiments may detect folding of the electronic device. For example, the processor may detect folding of the electronic device via various sensors (e.g., a hall sensor, a bending sensor).

In operation 705, the processor according to various embodiments may identify whether an external device is coupled. For example, as shown in the figure by the reference numeral 870 of FIG. 8C, the processor may identify whether a wired or wireless (e.g., Bluetooth) output device (e.g., an earphone, a headset) 804 is coupled. According to some embodiments, the processor may identify whether it is configured to perform a call via the external device 804 coupled in a wired or wireless manner.

If the identification result of operation 705 shows that the external device is not coupled ("No" in operation 705), in operation 707, the processor may display a call screen on an external display as a full screen. For example, as shown in the figures by reference numerals 820 and 850, when the electronic device is folded in a state where the external device 804 is not coupled, the processor may display the call screen 801 on an external display 82 as a full screen.

In operation 709, the processor according to various embodiments may turn off a speaker phone mode. For example, the electronic device may provide a call in the speaker phone mode (see 801a) in an unfolding state as shown in the figure by the reference numeral 840, and when switching to a folding state, may turn off the speaker phone mode (see 801b) as shown in the figure by the reference numeral 850. This is because a call with one hand is inconvenient in the unfolding state, whereas the call with one hand is easy in the folding state. According to some embodiments, operation 709 may be omitted. For example, operation 709 may not be performed according to a user's intention (setting).

If the identification result of operation 705 shows that the external device is coupled ("Yes" in operation 705), in operation 711, the processor may display a screen corresponding to the main window among the multi-windows on the external display 82. For example, as shown in the figure by a reference numeral 880, the processor may provide control such that a screen corresponding to a focused main window 802 is displayed on the external display 82. This is because, when the call is performed via the external device 804, the user is more likely to use the application displayed on the main window 802 than the call application.

In operation 713, the processor according to various embodiments may identify whether unfolding is detected. If the identification result of operation 713 shows that unfolding is detected ("Yes" in operation 713), the processor may return to operation 701. For example, as shown in the figures by reference numerals 830, 860, and 890, the processor may return to a before-folding state (a state where the multi-windows shown by the reference numerals 810, 840, and 870 are active).

If the identification result of operation 713 shows that unfolding is not detected ("No" in operation 713), in operation 715, the processor may identify whether the call ends. If the identification result of operation 715 shows that the call does not end ("No" in operation 715), the processor may return to operation 713. Otherwise, if the identification result of operation 715 shows that the call ends ("Yes" in operation 715), the processor may end a procedure of processing the pop-up window.

Figure 9:
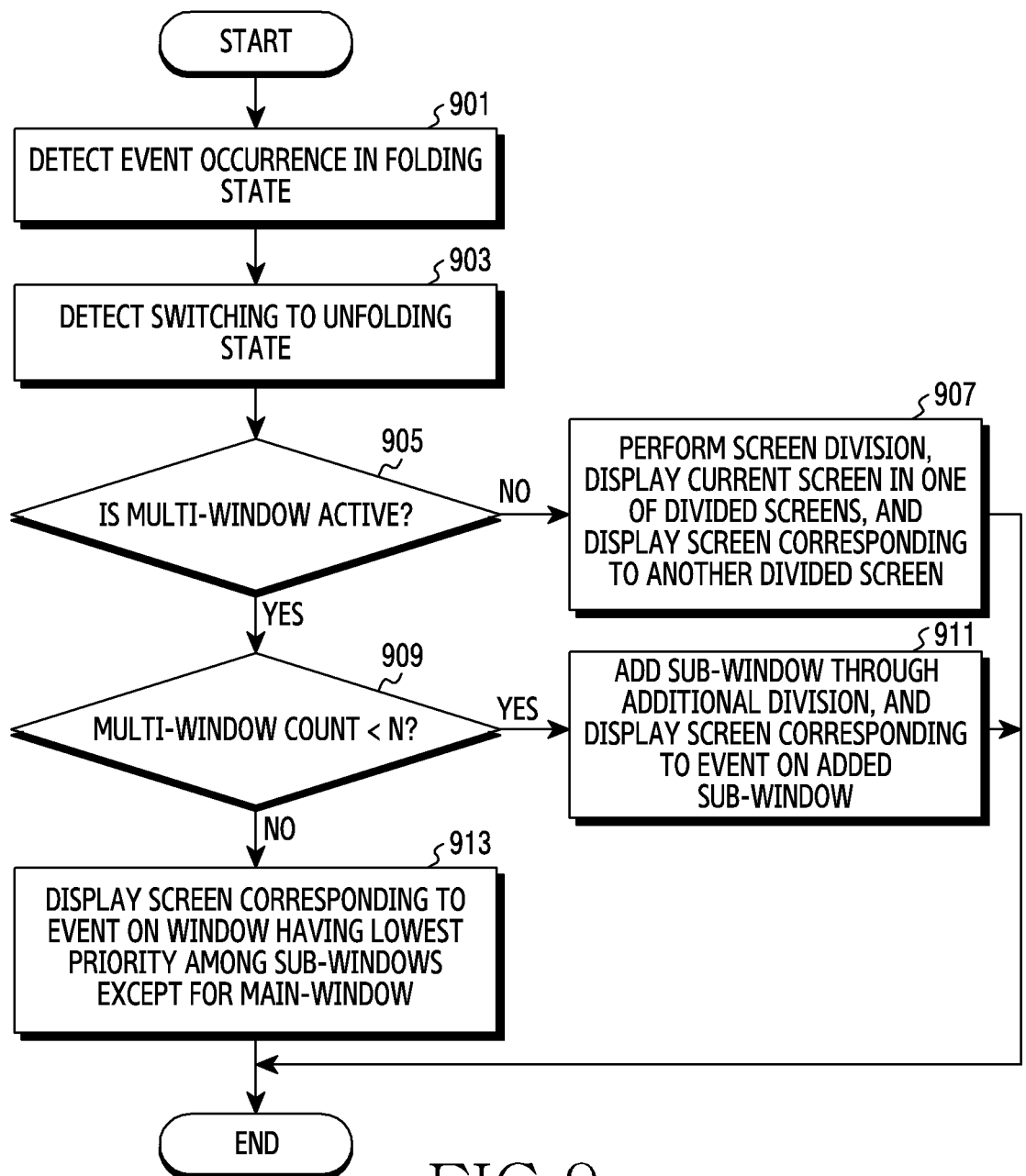
FIG. 9 is a flowchart illustrating an example method of processing a pop-up window of an electronic device when changing from a folding state to an unfolding state according to various embodiments.
Figure 10:
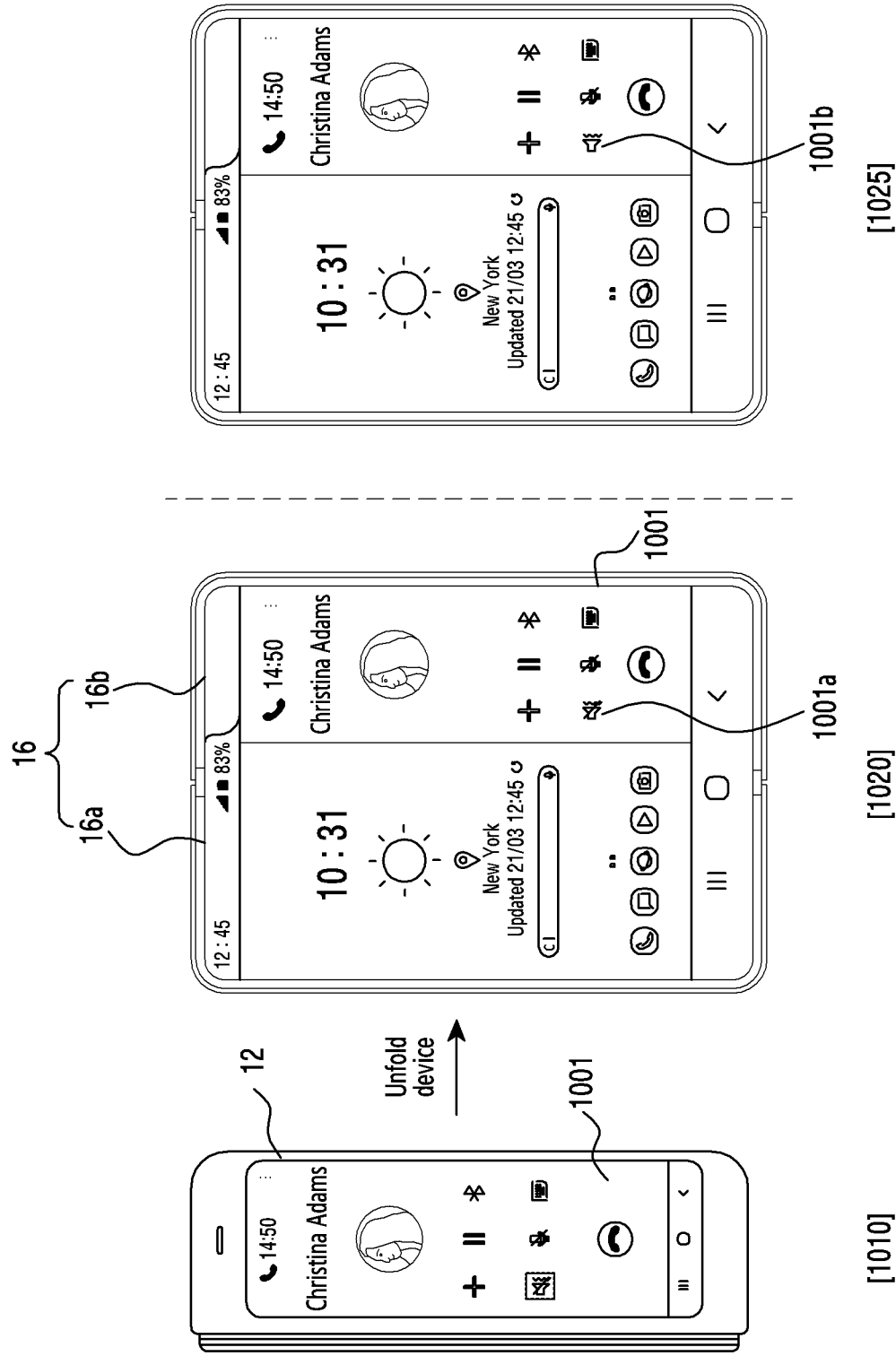
FIG. 10 is a diagram illustrating an example of processing a pop-up window of an electronic device when changing from a folding state to an unfolding state according to various embodiments.

FIG. 9 is a flowchart illustrating an example method of processing a pop-up window of an electronic device when changing from a folding state to an unfolding state according to various embodiments, and FIG. 10 illustrates an example of processing a pop-up window of an electronic device when changing from a folding state to an unfolding state according to various embodiments.

Referring to FIG. 9 and FIG. 10, in operation 901, a processor (e.g., the processor 120) of an electronic device (e.g., the electronic device 101) according to an embodiment of the present disclosure may detect occurrence of an event in the folding state. For example, the processor may detect occurrence of a reception event via a communication circuit (e.g., the communication module 190) in the folding state. In response to an input for granting a call request, as shown in the figure by a reference numeral 1010 of FIG. 10, the processor may provide control such that a call screen 1001 is displayed on an external display 12.

In operation 903, the processor according to various embodiments may detect switching to the unfolding state. In response to switching to the unfolding state, in operation 905, the processor may identify whether a multi-window is active.

If the identification result of operation 905 shows that the multi-window is not active (e.g., if only one application is executed or a home screen is displayed) ("No" in operation 905), in operation 907, the processor may divide a screen (a display), may display a current screen on one of divided screens, and may display an execution screen of an application corresponding to an event on another divided screen. For example, as shown in the figure by a reference numeral 1020, the processor may divide a display 16 into two regions, may display an execution screen (or a home screen) of a first application in the entirety of a first divided region (or a first window) 16a, and may display the call screen 1001 in the entirety of a second divided region (or a second window) 16b. Although it is illustrated herein that the screen is divided in a vertical direction in the figure by the reference numeral 1020, the processor may divide the screen in a horizontal direction according to a setting of the electronic device or a user's intention. In the unfolding case, the processor may maintain a state where a speaker phone mode is turned off (see 1001a). According to some embodiments, in the unfolding case, the processor may turn on the speaker phone mode (see 1001b), as shown in the figure by a reference numeral 1025.

If the identification result of operation 905 shows that the multi-window is active ("Yes" in operation 905), in operation 909, the processor may identify whether the number of multi-windows is less than a designated number N. Herein, N may be a natural number (a positive integer), and may be the maximum number of divided screens supported by the electronic device. For example, N may be 4. This is for exemplary purposes only, and the embodiment of the present disclosure is not limited thereto.

If the identification result of operation 909 shows that the number of multi-windows is less than the designated number ("Yes" in operation 909), in operation 911, the processor may control the display such that a screen (e.g., a call screen) corresponding to an event is displayed in the entirety of an added sub-window. Since operation 911 is similar to the operation 511 of FIG. 5 described with reference to FIG. 6B and FIG. 6C, detailed descriptions thereof will not be repeated here.

If the identification result of operation 909 shows that the number of multi-windows is not less than the designated number (e.g., if the number of multi-windows is equal to the designated number) ("No" in operation 909), in operation 913, the processor may display a screen (a call screen) corresponding to the event in the entirety of a sub-window having a lowest priority among sub-windows except for a main window. For example, as described above with reference to FIG. 3A, 3B, 4A and FIG. 4B, the processor may display a call screen in the entirety of the sub-window having the lowest priority among the sub-windows except for the main window.

Meanwhile, although event processing is described with reference to FIG. 9 and FIG. 10 when an event is received in the folding state and is changed to the unfolding state, an embodiment of the present disclosure is not limited thereto. This may also be similarly applied, for example, in a case where the processor receives an event in a lock state and is changed to an unlock state.

Figure 11A:
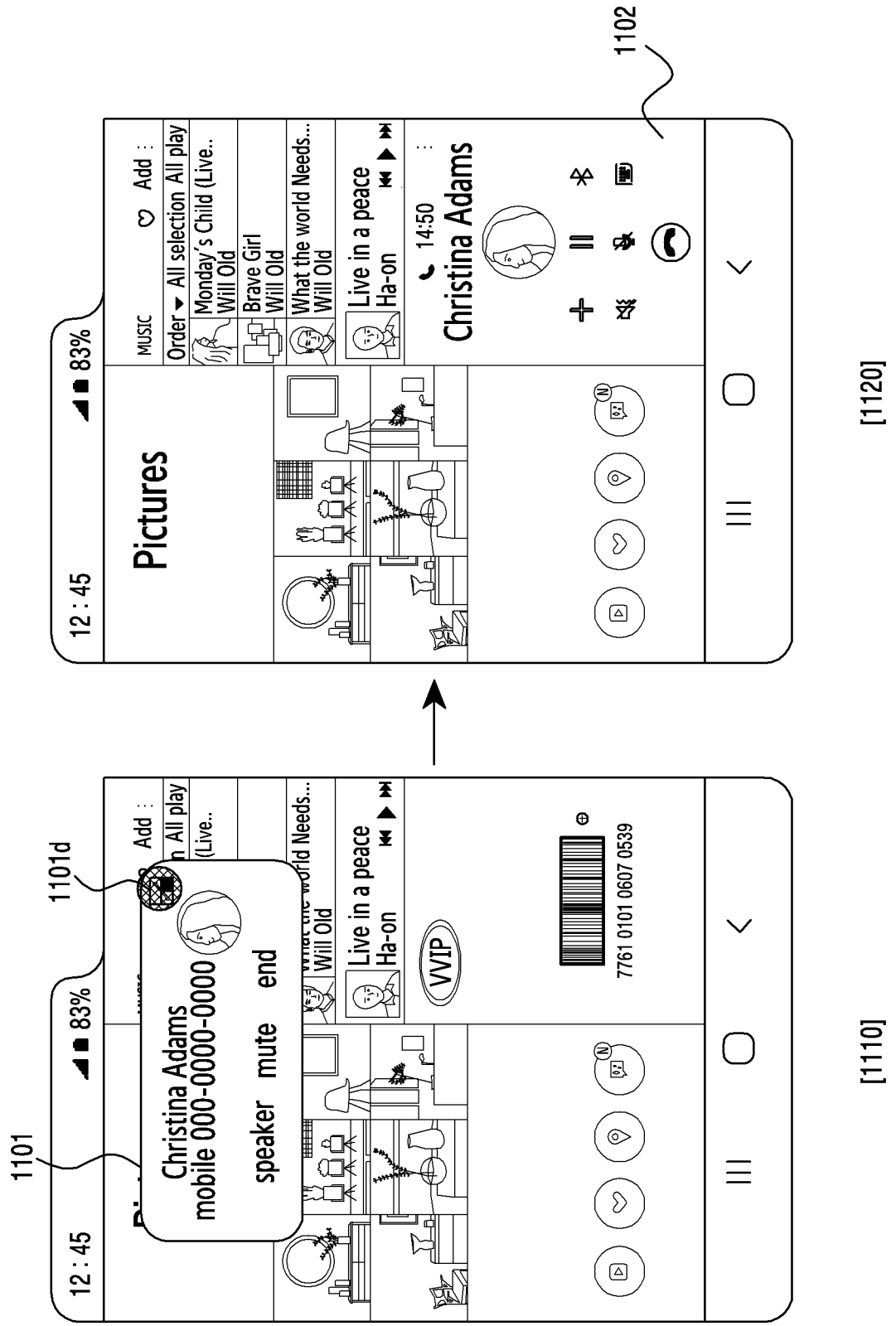
FIG. 11A is a diagram illustrating an example of visually notifying a location on a multi-window for displaying a pop-up window in an electronic device according to various embodiments.
Figure 11B:
FIG. 11B is a diagram illustrating an example of visually notifying a location on a multi-window for displaying a pop-up window in an electronic device according to various embodiments.
Figure 11B:
Figure 11B:
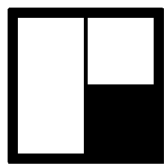
Figure 11B:
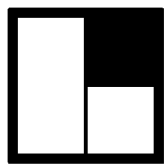
Figure 11B:
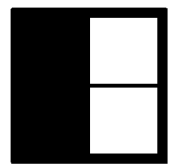
Figure 11B:
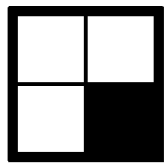
Figure 11B:
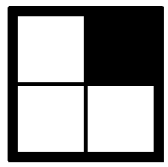
Figure 11B:
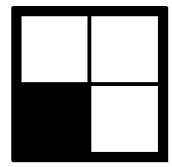
Figure 11B:
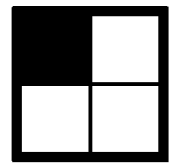

FIG. 11A and FIG. 11B are diagrams illustrating an example of visually notifying a location on a multi-window for displaying a pop-up window in an electronic device according to various embodiments.

Referring to FIG. 11A and FIG. 11B, an electronic device (e.g., the electronic device 101) according to an embodiment of the present disclosure may notify the user of a location on the multi-window for displaying an extended UI (a second UI) for a pop-up window 1101 using a visual object. The visual object may include an extension menu 1101d which requests to extend the pop-up window 1101. The visual object may have a layout shape corresponding to a disposition of the multi-window, and a region for displaying the extended UI may be displayed in different color. For example, if the extension menu 1101d is selected (e.g., touched) in a state as shown in the figure by a reference numeral 1110, the processor may provide control such that a call screen 1102 is displayed in the entirety of a third window at a lower right end.

According to some embodiments, as shown in FIG. 11B, the visual object may have various shapes. For example, a visual object shown by a reference numeral 1130 may imply that a call screen is displayed on a second window (a right window) out of two divided windows, and the visual object shown by a reference numeral 1135 may imply that a call screen is displayed on a first window (a left window) out of the two divided windows. For another example, a visual object indicated by a reference numeral 1150 may imply that the call screen is displayed on a third window (a lower right window) out of three divided windows, a visual object indicated by a reference numeral 1153 may imply that the call screen is displayed on a second window (an upper right window) out of the three divided windows, and a visual object indicated by a reference numeral 1155 may imply that the call scree is displayed on a first window (a left window) out of the three divided windows. For another example, a visual object indicated by a reference numeral 1170 may imply that the call screen is displayed on a fourth window (a lower right window) out of four divided windows, a visual object indicated by a reference numeral 1172 may imply that the call screen is displayed on a third window (an upper right window) out of the four divided windows, a visual object indicated by a reference numeral 1174 may imply that the call screen is displayed on a second window (a lower left window) out of the fourth divided windows, and a visual object indicated by a reference numeral 1176 may imply that the call screen is displayed on a first window (an upper left window) out of the four divided windows.

Although it is illustrated in FIG. 11A and FIG. 11B that the extension menu 1101d includes a visual object, the visual object may be displayed separately, instead of being included in the extension menu 1101d.

Figure 12A:
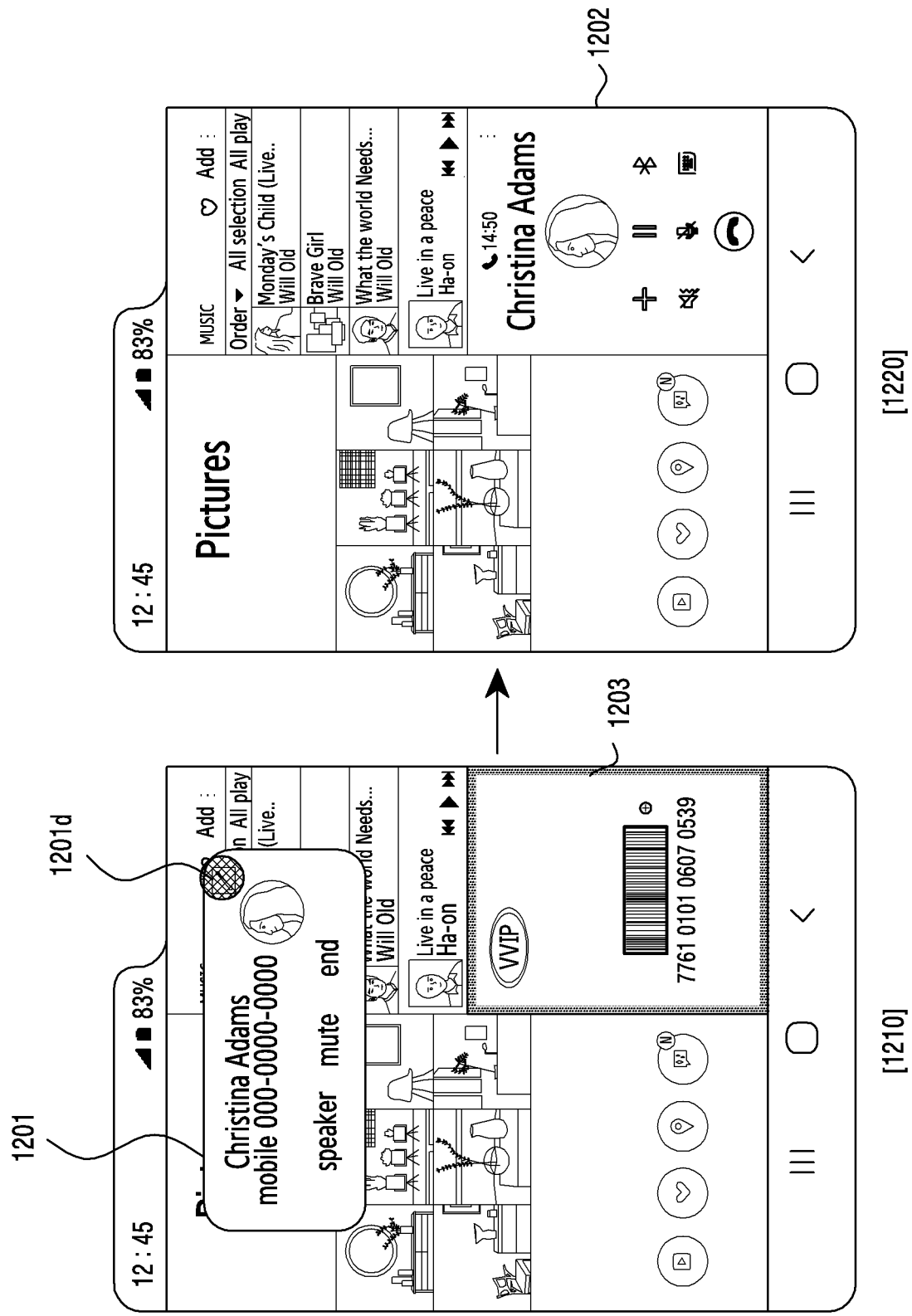
FIG. 12A is a diagram illustrating an example of visually notifying a location on a multi-window for displaying a pop-up window in an electronic device according to various embodiments.
Figure 12B:
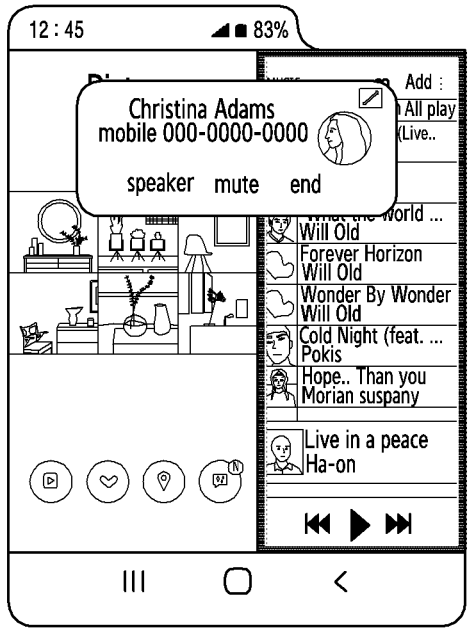
FIG. 12B is a diagram illustrating an example of visually notifying a location on a multi-window for displaying a pop-up window in an electronic device according to various embodiments.
Figure 12B:
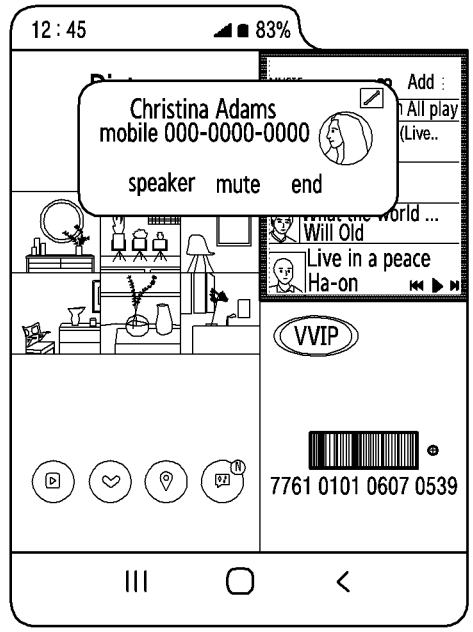
Figure 12B:
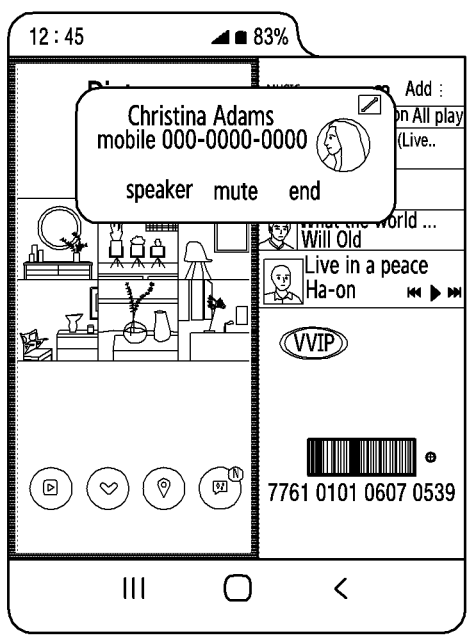
Figure 12B:
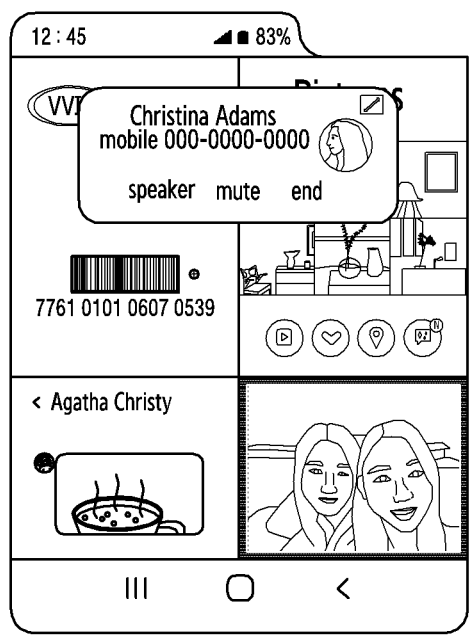

FIG. 12A and FIG. 12B are diagrams illustrating an example of visually notifying a location on a multi-window for displaying a pop-up window in an electronic device according to various embodiments.

Referring to FIG. 12A and FIG. 12B, an electronic device (e.g., the electronic device 101) according to an embodiment of the present disclosure may notify a user of a location on a multi-window for displaying an extended UI (e.g., a second UI) related to a pop-up window 1201 using a visual object. The processor may display an object (e.g., highlighting or focusing) (see 1203) on one of the multi-windows to be visually identified and thus may notify the user of the location on the multi-window for displaying the extended UI. For example, if an extension menu 1201d is selected (e.g., touched) in a state where a third window at a lower right end is highlighted (or focused) as shown in the figure by a reference numeral 1210, the processor may provide control such that a call screen 1202 is displayed in the entirety of the third window at the lower right end as shown in the figure by a reference numeral 1220.

Meanwhile, the figure by a reference numeral 1230 of FIG. 12B may imply that the call screen is displayed on a second window (the right window) out of two divided windows, the figure by a reference numeral 1235 of FIG.

12B may imply that the call screen is displayed on a second window (an upper light window) out of three divided windows, the figure by a reference numeral 1250 of FIG. 12B may imply that the call screen is displayed on a first window (a left window) out of three divided windows, and the figure by a reference numeral 1255 of FIG. 12B may imply that the call screen is displayed on a fourth window (a lower right window) out of four divided windows.

Figure 13:
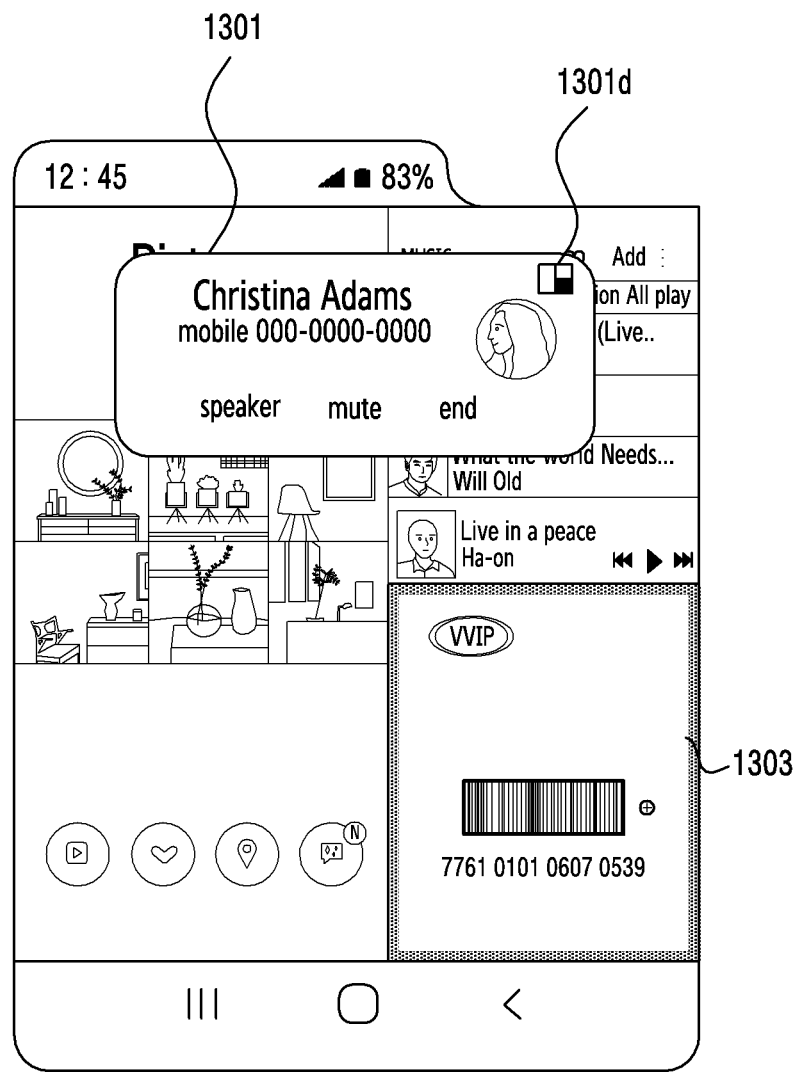
FIG. 13 is a diagram illustrating an example of visually notifying a location on a multi-window for displaying a pop-up window in an electronic device according to various embodiments.

FIG. 13 is a diagram illustrating an example of visually notifying a location on a multi-window for displaying a pop-up window in an electronic device according to various embodiments.

Referring to FIG. 13, an electronic device (e.g., the electronic device 101) according to an embodiment of the present disclosure may notify a user of a location on a multi-window for displaying an extended UI (e.g., a second UI) related to a pop-up window 1301 (or an event) by combining methods described with reference to FIG. 11A, 11B, 12A and FIG. 12B. For example, as shown in FIG. 13, the electronic device may display an extension menu 1301*d* including a first visual object indicating a location at which the second UI is displayed in one region of the pop-up window 1301, and may display a second visual objet 1303 (e.g., highlighting or focusing) on a window for displaying the second UI among the multi-windows.

According to various example embodiments of the present disclosure, an electronic device (e.g., the electronic device 101) may comprise: a housing; a display (e.g., the display module 160) viewable through a first face of the housing; a processor (e.g., the processor 120) operatively coupled with the display; and a memory (e.g., the memory 130) operatively coupled with the processor, wherein the memory stores instructions which, when executed, cause the processor to control the electronic device to: in response to occurrence of an event, display a pop-up window (e.g., the pop-up window 301, 401, 601, 1101, 1201, 1301) comprising a first User Interface (UI) corresponding to the event in some regions of the display, detect an input requesting extending and displaying the pop-up window, identify whether a multi-window is active in response to detecting the input, and based on the multi-window being active, remove the pop-up window and display a second UI for the event on a sub-window having a lowest priority among at least one sub-window other than a main window among the multi-windows.

According to various example embodiments, the instructions, when executed, may cause the processor to control the electronic device to: based on the multi-window not being active, divide a screen region of the display into two regions, display a current screen on any one of the divided screen regions, and display the second UI on the other screen region.

According to various example embodiments, the priority may be determined based on a usage history of the multi-window.

According to various example embodiments, the main window may include a window having a greatest size among the multi-windows or a window currently focused.

According to various example embodiments, the instructions, when executed, may cause the processor to control the electronic device to: further display a visual object indicating a location on the multi-window for displaying the second UI based on the pop-up window being displayed, and the visual object may comprise at least one of a first visual object in an extension menu requesting extension of the pop-up window and a second visual object allowing a window for displaying the second UI to be visually identified from another window among the multi-windows.

According to various example embodiments, the event nay be a call reception event.

According to various example embodiments, the display may comprise a foldable flexible display, the electronic device may further comprise an external display (e.g., the external display 82) viewable through a second face opposite the first face, and the instructions, when executed, may cause the processor to control the electronic device to: display a call screen on the external display as a full screen based on the electronic device being folded.

According to various example embodiments, the instructions, when executed, may cause the processor to control the electronic device to: activate a call with a speaker mode in response to accepting the call in an unfolding state of the electronic device, and turn off the speaker mode in response to detecting folding of the electronic device while calling with the speaker mode.

According to various example embodiments, the instructions, when executed, may cause the processor to control the electronic device to: identify whether the external device is coupled upon detecting the folding of the electronic device, display a screen corresponding to the main window on the external display as a full screen based on identifying that the external device is coupled, and display the call screen on the external display as the full screen based on identifying that the electronic device is not coupled.

According to various example embodiments, the display may comprise a foldable flexible display, the electronic device may further comprise an external display viewable through a second face opposite the first face, and the instructions, when executed, may cause the processor to control the electronic device to: display a call screen on the external display as a full screen, in response to receiving a call request in a folding state of the electronic device, determine whether the multi-window is active in response to detecting the unfolding of the electronic device, and control displaying of the call screen based on the determination.

According to various example embodiments of the present disclosure, an electronic device (e.g., the electronic device 101) may comprise: a housing; a display (e.g., the display module 160) viewable through a first face of the housing; a processor (e.g., the processor 120) operatively coupled with the display; and a memory (e.g., the memory 130) operatively coupled with the processor, wherein the memory stores instructions which, when executed, cause the processor to control the electronic device to: in response to occurrence of an event, display a pop-up window (e.g., the pop-up window 301, 401, 601, 1101, 1201, 1301) comprising a first User Interface (UI) corresponding to the event in some regions of the display, detect an input requesting extending and displaying the pop-up window, identify whether a multi-window is active in response to the detection of the input, based on the multi-window being active, identify whether the number of active multi-windows is less than a designated number, and based on the number of active multi-windows being less than the designated number: remove the pop-up window, add a sub-window through additional division of the display, and display a second UI for the event on the added sub-window.

According to various example embodiments, the instructions, when executed, may cause the processor to control the electronic device to: based on the number of active multi-windows being equal to the designated number, display the second UI on a sub-window having a lowest priority among at least one sub-window other than a main window among the multi-windows.

According to various example embodiments, the instructions, when executed, may cause the processor to control the electronic device to: based on the multi-window not being active, divide a screen region of the display into two regions, display a current screen on any one of the divided screen regions, and display the second UI on an other screen region.

According to various example embodiments of the present disclosure, a method of processing a pop-up window (e.g., the pop-up window 301, 401, 601, 1101, 1201, 1301) using a multi-window of an electronic device (e.g., the electronic device 101) may comprise: in response to occurrence of an event, displaying a pop-up window comprising a first User Interface (UI) corresponding to the event in some regions of a display (e.g., the display module 160); in response to an input requesting extending the pop-up window, identifying whether the multi-window is active; based on the multi-window being active, identifying whether the number of active multi-windows is less than a designated number; and based on the number of active multi-windows being less than the designated number: removing the pop-up window, add a sub-window through additional division of the display, and displaying a second UI for the event on the added sub-window.

According to various example embodiments, the method may further comprise: dividing, based on the multi-window not being active, a screen region of the display into two regions, displaying a current screen on any one of the divided screen regions, and displaying the second UI on the other screen region.

According to various example embodiments, the method may further comprise: displaying, based on the number of active multi-windows being equal to the designated number, the second UI on a sub-window having a lowest priority among at least one sub-window other than a main window among the multi-windows.

According to various example embodiments, the priority may be determined based on a usage history of the multi-window, and the main window may be a window having a greatest size among the multi-windows or a window currently focused.

According to various example embodiments, the method may further comprise: at least one of displaying a first visual object indicating a location on the multi-window for displaying the second UI on an extension menu requesting extension of the pop-up window, and displaying a second visual object allowing a window for displaying the second UI to be visually identified from another window among the multi-windows.

According to various example embodiments, the electronic device may be a foldable-type electronic device. The foldable-type electronic device may further comprise an external display (e.g., the external display 82) viewable through a second face opposite a first face through which the display is viewable. The event may include a call reception event. The method may further comprise: identifying whether the external device is coupled base on detecting the folding of the electronic device; displaying a screen corresponding to the main window on the external display as a full screen based on identifying that the external device is coupled; and displaying the call screen on the external display as the full screen based on the electronic device not being coupled, and turning off a speaker mode.

According to various example embodiments, the electronic device may comprise a foldable-type electronic device. The foldable-type electronic device may further comprise an external display viewable through a second face opposite a first face through which the display is viewable. The event may include a call reception event. The method may further comprise: displaying a call screen on the external display as a full screen, in response to receiving the call request in a folding state of the electronic device; determining whether the multi-window is active, in response to detecting unfolding of the electronic device; and controlling the displaying of the call screen, based on the determination result.

Various example embodiments of the present disclosure can process a pop-up window (e.g., switching of a display mode) using a multi-window when there is a request for displaying a pop-up window by enlarging the pop-up window, thereby maintaining usability of the existing application. In addition, various embodiments of the present disclosure can effectively control the display mode of the pop-up window depending on folding and/or unfolding of a foldable-type electronic device, thereby improving user's convenience.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that the various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separated and disposed to other component. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
   a housing;
   a display viewable through a first face of the housing;
   a processor operatively coupled with the display; and
   a memory operatively coupled with the processor, wherein the memory stores instructions which, when executed, cause the processor to control the electronic device to:
   in response to occurrence of an event, display a pop-up window overlapping one or more other windows displayed on the display and comprising a first User Interface (UI) corresponding to the event,
   after displaying the pop-up window, detect an input requesting extending and displaying the displayed pop-up window,
   identify whether a multi-window is active in response to the detection of the input requesting the extending and displaying the pop-up window, wherein in the active multi-window the display is divided into a plurality of sub-windows each displaying an execution screen of an application, and
   based on the multi-window being active, remove the pop-up window and display a second UI for the event on a sub-window of the plurality of sub-windows having a lowest priority among at least one sub-window other than a main window among the plurality of sub-windows,
   based on the multi-window not being active, divide a screen of the display into a number of regions, and display the second UI for the event on one of the divided screen regions,
   wherein the priority is determined based on a usage history of the multi-window.

2. The electronic device of claim 1, wherein the instructions, when executed, cause the processor to control the electronic device to: based on the multi-window not being active, divide the screen region of the display into two regions, display a current screen on any one of the divided screen regions, and display the second UI on the other screen region.

3. The electronic device of claim 1, wherein the main window includes a window having a greatest size among the multi-windows or a window currently focused.

4. The electronic device of claim 1,
   wherein the instructions, when executed, cause the processor to control the electronic device to further display a visual object indicating a location on the multi-window for displaying the second UI based on the pop-up window being displayed, and
   wherein the visual object comprises at least one of a first visual object included in an extension menu requesting extension of the pop-up window and a second visual object allowing a window for displaying the second UI to be visually identified from another window among the multi-windows.

5. The electronic device of claim 1, wherein the event is a call reception event.

6. The electronic device of claim 5,
   wherein the display comprises a foldable flexible display,
   wherein the electronic device further comprises an external display viewable through a second face opposite the first face, and
   wherein the instructions, when executed, cause the processor to display a call screen on the external display as a full screen based on the electronic device being folded.

7. The electronic device of claim 6, wherein the instructions, when executed, cause the processor to control the electronic device to: activate a call with a speaker mode in response to accepting the call in an unfolding state of the electronic device, and turn off the speaker mode in response to detecting folding of the electronic device while calling with the speaker mode.

8. The electronic device of claim 6, wherein the instructions, when executed, cause the processor to:
identify whether the external device is coupled upon detecting the folding of the electronic device,
display a screen corresponding to the main window on the external display as a full screen based on the external device being coupled, and
display the call screen on the external display as the full screen based on the electronic device not being coupled.

9. The electronic device of claim 5,
wherein the display comprises a foldable flexible display,
wherein the electronic device further comprises an external display viewable through a second face opposite the first face, and
wherein the instructions, when executed, cause the processor to control the electronic device to:
display a call screen on the external display as a full screen, in response to receiving a call request in a folding state of the electronic device,
determine whether the multi-window is active, in response to detecting the unfolding of the electronic device, and
control displaying of the call screen, based on the determination.

10. An electronic device comprising:
a housing;
a display viewable through a first face of the housing;
a processor operatively coupled with the display; and
a memory operatively coupled with the processor, wherein the memory stores instructions which, when executed, cause the processor to control the electronic device to:
in response to occurrence of an event, display a pop-up window overlapping one or more other windows displayed on the display and comprising a first User Interface (UI) corresponding to the event,
after displaying the pop-up window, detect an input requesting extending and displaying the displayed pop-up window,
identify whether a multi-window is active in response to the detection of the input requesting the extending and displaying the pop-up window, wherein in the active multi-window the display is divided into a plurality of sub-windows each displaying an execution screen of an application,
based on the multi-window being active, identify whether a number of active sub-windows is less than a designated number,
based on the number of active sub-windows being less than the designated number: remove the pop-up window, add a sub-window through additional division of the display, and display a second UI for the event on the added sub-window, and
based on the number of active sub-windows not being less than the designated number: remove the pop-up window, and display the second UI for the event on a sub-window of the plurality of sub-windows having a lowest priority among at least one sub-window other than a main window among the plurality window.

11. The electronic device of claim 10, wherein the instructions, when executed, cause the processor to control the electronic device to: based on the multi-window not being active: divide a screen region of the display into two regions, display a current screen on any one of the divided screen regions, and display the second UI on the other screen region.

12. A method of processing a pop-up window using a multi-window of an electronic device, the method comprising:
in response to occurrence of an event, displaying a pop-up window overlapping one or more other windows displayed on the display and comprising a first User Interface (UI) corresponding to the event;
in response to an input requesting extending the pop-up window, identifying whether the multi-window is active, wherein in the active multi-window the display is divided into a plurality of sub-windows each displaying an execution screen of an application;
based on the multi-window being active, identifying whether a number of active sub-windows is less than a designated number;
based on the number of active sub-windows being less than the designated number: removing the pop-up window, add a sub-window through additional division of the display, and displaying a second UI for the event on the added sub-window; and
based on the number of active sub-windows not being less than the designated number: removing the pop-up window, and displaying the second UI for the event on a sub-window of the plurality of sub-windows having a lowest priority among at least one sub-window other than a main window among the plurality window.

13. The method of claim 12, further comprising:
based on the multi-window not being active: dividing a screen region of the display into two regions, displaying a current screen on any one of the divided screen regions, and displaying the second UI on an other screen region.

14. The method of claim 12,
wherein the priority is determined based on a usage history of the multi-window, and
wherein the main window includes a window having a greatest size among the multi-windows or a window which is currently focused.

15. The method of claim 12, further comprising at least one of:
displaying a first visual object indicating a location on the sub-window for displaying the second UI on an extension menu requesting extension of the pop-up window; and
displaying a second visual object allowing a window for displaying the second UI to be visually identified from another window among the plurality of sub-windows.

16. The method of claim 12,
wherein the electronic device comprises a foldable-type electronic device further comprising an external display viewable through a second face opposite a first face through which the display is viewable, and the event includes a call reception event,
wherein the method further comprises:
identifying whether the external device is coupled upon detecting the folding of the electronic device;
displaying a screen corresponding to the main window on the external display as a full screen based on the external device being coupled; and
displaying the call screen on the external display as the full screen based on the electronic device not being coupled, and turning off a speaker mode.

17. The method of claim 12,
wherein the electronic device comprises a foldable-type electronic device further comprising an external display viewable through a second face opposite a first face through which the display is viewable, and the event includes a call reception event,
wherein the method further comprises:
displaying a call screen on the external display as a full screen, in response to receiving the call request in a folding state of the electronic device;
determining whether the multi-window is active, in response to detecting unfolding of the electronic device; and
controlling the displaying of the call screen, based on the determination.

* * * * *